(12) United States Patent
Siomina et al.

(10) Patent No.: US 11,595,165 B2
(45) Date of Patent: *Feb. 28, 2023

(54) NODE FOR A RADIO COMMUNICATION NETWORK AND OPERATING METHOD

(71) Applicant: Telefonaktiebolaget LM Ericsson (publ), Stockholm (SE)

(72) Inventors: Iana Siomina, Täby (SE); Robert Baldemair, Solna (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/763,948

(22) PCT Filed: Sep. 29, 2017

(86) PCT No.: PCT/EP2017/074787
§ 371 (c)(1),
(2) Date: Mar. 28, 2018

(87) PCT Pub. No.: WO2018/060431
PCT Pub. Date: Apr. 5, 2018

(65) Prior Publication Data
US 2019/0058556 A1   Feb. 21, 2019

Related U.S. Application Data

(60) Provisional application No. 62/402,432, filed on Sep. 30, 2016.

(51) Int. Cl.
*H04L 5/00* (2006.01)
*H04L 1/1825* (2023.01)
(Continued)

(52) U.S. Cl.
CPC .......... *H04L 5/0048* (2013.01); *H04L 1/0026* (2013.01); *H04L 1/1607* (2013.01);
(Continued)

(58) Field of Classification Search
CPC ... H04L 5/0048; H04L 1/0026; H04L 1/1607; H04L 1/1812; H04L 1/1825;
(Continued)

(56) References Cited

U.S. PATENT DOCUMENTS

2004/0190552 A1   9/2004   Kim et al.
2005/0204247 A1   9/2005   Guo et al.
(Continued)

FOREIGN PATENT DOCUMENTS

CN   103997396 A   8/2014
CN   105052216 A   11/2015
(Continued)

OTHER PUBLICATIONS

Qualcomm, "PUCCH resources for multi-bit ACK and resource indexing", R1-106342, Nov. 15-19, 2010. (From Applicant's IDS) (Year: 2010).*

(Continued)

*Primary Examiner* — Mang Hang Yeung
(74) *Attorney, Agent, or Firm* — Withrow & Terranova, PLLC

(57) ABSTRACT

A node for a radio communication network is described, said node being arranged for a communication mechanism comprising the reception of a first transmission and the subsequent sending of a second transmission in response to said first transmission, wherein said node is furthermore arranged to perform a selecting process for selecting a relative timing for sending said second transmission from among a plurality of predetermined relative timing choices.

16 Claims, 17 Drawing Sheets

(51) Int. Cl.
*H04L 1/1829* (2023.01)
*H04L 1/00* (2006.01)
*H04L 1/1607* (2023.01)
*H04L 1/1812* (2023.01)

(52) U.S. Cl.
CPC .......... *H04L 1/1812* (2013.01); *H04L 1/1825* (2013.01); *H04L 1/1854* (2013.01); *H04L 1/1864* (2013.01); *H04L 5/0058* (2013.01); *H04L 5/0078* (2013.01)

(58) Field of Classification Search
CPC ... H04L 1/1854; H04L 1/1864; H04L 5/0078; H04L 5/0058
USPC .......................................................... 370/329
See application file for complete search history.

(56) References Cited

U.S. PATENT DOCUMENTS

| | | | |
|---|---|---|---|
| 2006/0133273 | A1 | 6/2006 | Julian et al. |
| 2006/0204247 | A1 | 9/2006 | Murphy |
| 2009/0147734 | A1 | 6/2009 | Naka et al. |
| 2009/0196204 | A1 | 8/2009 | Astely et al. |
| 2012/0113831 | A1* | 5/2012 | Pelletier ................. H04L 5/0058 370/252 |
| 2012/0257513 | A1* | 10/2012 | Yamada ............ H04W 72/0413 370/328 |
| 2015/0181588 | A1* | 6/2015 | Song ................. H04W 72/0413 370/280 |
| 2016/0105907 | A1* | 4/2016 | Lee ..................... H04L 27/2601 370/336 |
| 2016/0330739 | A1* | 11/2016 | Webb ..................... H04L 5/001 |
| 2017/0230971 | A1* | 8/2017 | Lee ....................... H04L 1/1854 |
| 2017/0288819 | A1* | 10/2017 | Chen .................... H04L 1/1854 |
| 2018/0054800 | A1* | 2/2018 | Yeo ....................... H04W 68/02 |
| 2018/0092072 | A1* | 3/2018 | Babaei ...................... H04L 5/00 |
| 2018/0242240 | A1 | 8/2018 | Sato |
| 2019/0036654 | A1* | 1/2019 | Kim ....................... H04L 1/1812 |
| 2019/0159265 | A1* | 5/2019 | Takeda .................. H04W 28/06 |
| 2019/0200315 | A1* | 6/2019 | Tsai ...................... H04B 7/0617 |
| 2019/0239214 | A1* | 8/2019 | Yang ..................... H04L 1/1887 |
| 2020/0205184 | A1* | 6/2020 | Chendamarai Kannan ................. H04W 72/1284 |

FOREIGN PATENT DOCUMENTS

| | | |
|---|---|---|
| CN | 105164938 A | 12/2015 |
| CN | 105706519 A | 6/2016 |
| EP | 2640138 A1 | 9/2013 |
| JP | 2009189064 A | 8/2009 |
| JP | 2013520050 A | 5/2013 |
| WO | 2012041422 A2 | 4/2012 |
| WO | 2016098401 A1 | 6/2016 |
| WO | 2016117643 A1 | 7/2016 |

OTHER PUBLICATIONS

Ericsson, "NB-IoT—Remaining issues for UCI", R1-162778, Apr. 11-15, 2016 (From Applicant's IDS) (Year: 2016).*
Result of Consultation for European Patent Application No. 17777884. 2, dated Jul. 24, 2019, 5 pages.
Official Action for Russian Patent Application No. 2019112882, dated Aug. 1, 2019, 11 pages.
Non-Final Office Action for U.S. Appl. No. 16/380,029, dated Jul. 9, 2019, 12 pages.
Intel Corporation, "R2-165002: Discussion on HARQ operations for NR," 3GPP TSG-RAN2 Meeting #95, Aug. 22-26, 2016, Gothenburg, Sweden, 4 pages.
NTT DOCOMO, Inc., "R1-167372: Views on processing time reduction and related procedures," 3GPP TSG RAN WG1 Meeting #86, Aug. 22-26, 2016, Gothenburg, Sweden, 6 pages.
Qualcomm Incorporated, "R1-106342: PUCCH resources for multi-bit ACK and resource indexing," 3GPP TSG RAN WG1 #63, Nov. 15-19, 2010, Jacksonville, USA, 3 pages.
Samsung, "R1-166692: Overview of latency reduction operation with subframe TTI for FS1," 3GPP TSG RAN WG1 Meeting #86, Aug. 22-26, 2016, Gothenburg, Sweden, 3 pages.
Samsung, "R2-165175: MAC Aspects for Supporting Multiple Services," 3GPP TSG-RAN WG2 Meeting #95, Aug. 22-26, 2016, Göteborg, Sweden, 4 pages.
Office Action for Canadian Patent Application No. 3,038,999, dated Apr. 29, 2020, 3 pages.
Examination Report for European Patent Application No. 17777884. 2, dated Apr. 21, 2020, 5 pages.
Search Report for Japanese Patent Application No. 2019-514261, dated Apr. 14, 2020, 42 pages.
Notice of Reasons of Refusal for Japanese Patent Application No. 2019-514261, dated May 21, 2020, 6 pages.
Notice of Preliminary Rejection for Korean Patent Application No. 10-2019-7008695, dated Apr. 28, 2020, 11 pages.
Non-Final Office Action for U.S. Appl. No. 16/380,029, dated Mar. 25, 2020, 11 pages.
Office Action for Canadian Patent Application No. 3,038,999, dated Jan. 28, 2021, 4 pages.
First Office Action for Chinese Patent Application No. 201780060837. 7, dated Aug. 27, 2021, 14 pages.
Intention to Grant for European Patent Application No. 17777884.2, dated Jan. 14, 2021, 5 pages.
Result of Consultation for European Patent Application No. 17777884. 2, dated May 27, 2021, 3 pages.
Intention to Grant for European Patent Application No. 117777884. 2, dated Jul. 1, 2021, 5 pages.
Decision to Grant for Japanese Patent Application No. 2019-514261, dated Jan. 27, 2021, 5 pages.
Ericsson, "R1-162778: NB-IoT—Remaining issues for UCI," 3GPP TSG RAN WG1 Meeting #84-bis, Apr. 11-15, 2016, Busan, Korea, 5 pages.
Ericsson, "R1-162780: NB-IoT—Remaining issues for random access procedure," 3GPP TSG RAN WG1 Meeting #84bis, Apr. 11-15, 2016, Busan, Korea, 4 pages.
Huawei, et al., "R1-162628: UCI for NB-IoT," 3GPP TSG RAN WG1 Meeting #84bis, Apr. 11-15, 2016, Busan, Korea, 7 pages.
Huawei, et al., "R1-164847: Clarifications on NPDCCH monitoring in 36.213," 3GPP TSG RAN WG1 Meeting #85, May 23-27, 2016, Nanjing, China, 3 pages.
LG Electronics, "R1-162463: Remaining issues on Uci," 3GPP TSG RAN WG1 Meeting #84bis, Apr. 11-15, 2016, Busan, Korea, 4 pages.
Mediatek Inc., "R1-163261: Remaining Issues on UCI Transmission," 3GPP TSG RAN WG1 Meeting #84bis, Apr. 11-15, 2016, Busan, Korea, 4 pages.
Samsung, "R2-152079: Miscellaneous corrections (a.o. Sidelink)," Change Request, 3GPP TSG-RAN2 Meeting #90, May 25-29, 2015, Fukuoka, Japan, 447 pages.
Second Office Action for Chinese Patent Application No. 201780060837. 7, dated Apr. 2, 2022, 11 pages.
Notice of Reasons of Refusal for Japanese Patent Application No. 2021-031995, dated Apr. 4, 2022, 6 pages.
Non-Final Office Action for U.S. Appl. No. 17/507,006, dated Sep. 16, 2022, 14 pages.
Author Unknown, "Technical Specification Group Radio Access Network; Evolved Universal Terrestrial Radio Access (E-UTRA); Physical channels and modulation (Release 13)," Technical Specification 36.211, Version 13.2.0, 3GPP Organizational Partners, Jun. 2016, 168 pages.
Ericsson, "R1-167052: On multi-subframe scheduling for uplink transmissions," Third Generation Partnership Project (3GPP), TSG RAN WG1 Meeting #86, Aug. 22-26, 2016, 3 pages, Gothenburg, Sweden.
Ericsson, et al., "R4-166735: Way forward for NR RRM," Third Generation Partnership Project (3GPP), TSG-RAN WG4 Meeting #80, Aug. 22-26, 2016, 1 page, Gothenburg, Sweden.

(56) References Cited

OTHER PUBLICATIONS

International Search Report and Written Opinion for International Patent Application No. PCT/EP2017/074787, dated Dec. 7, 2017, 15 pages.
Author Unknown, "Technical Specification Group Radio Access Network; Evolved Universal Terrestrial Radio Access (E-UTRA); Physical layer procedures (Release 13)," Technical Specification 36.213, Version 13.2.0, Jun. 2016, 3GPP Organizational Partners, 381 pages.
Request for the Submission of an Opinion for Korean Patent Application No. 10-2022-7006790, dated May 19, 2022, 12 pages.

* cited by examiner

NODE FOR A RADIO COMMUNICATION NETWORK AND OPERATING METHOD

This application is a 35 U.S.C. § 371 national phase filing of International Application No. PCT/EP2017/074787, filed Sep. 29, 2017, which claims the benefit of U.S. Provisional Application No. 62/402,432, filed Sep. 30, 2016, the disclosures of which are incorporated herein by reference in their entireties.

TECHNICAL FIELD

The present invention relates to radio communication networks generally, in which transmissions are sent between nodes, and especially to a node for such a communication network and a method of operating such a node.

BACKGROUND

Radio communication networks which are currently deployed and/or being developed include networks having a UMTS (Universal Mobile Telecommunications System; also known as 3G) or an LTE (Long Term Evolution; also known as 4G) architecture. Presently, a further standard referred to as New Radio (NR), but also known as 5G or Next Generation, is under development.

In such networks, network nodes (e.g. denoted eNodeB or eNB in LTE, and gNB in NR) and wireless devices (e.g. user equipments, UEs) send and receive radio transmissions, some of which are sent in response to preceding transmissions.

In LTE architectures, the relative timing of such response is fixed by the agreed standards. For example, ACK/NACK feedback is used by a node receiving a transmission to inform a transmitting node that its transmission has been or has not been successfully received. The ACK/NACKs may be transmitted in response to downlink (DL) transmissions by UE (via UL control channel or data channel) or eNB (via Physical Hybrid Indicator Channel PHICH) in response to uplink (UL) transmissions, respectively.

Depending on the configuration of the network, a HARQ feedback transmitted by the wireless device is in general transmitted 4 subframes after (n+4) the reception of a transmission (in subframe n), for frequency division duplex (FDD). For Time division duplex, TDD, the relation is also pre-defined. In Half Duplex FDD, HD-FDD, the timing relation between reception of data at the UE and transmission of HARQ A/N in the uplink is also pre-defined e.g. in Narrowband Internet of Things, NB-IoT, the ACK/NACK is sent in subframe n+12.

NR architectures being currently discussed by the Third Generation Partnership Project, 3GPP, are envisaged to offer some level of interoperability with LTE networks.

SUMMARY

The object of the invention is to provide a node for a radio communication network with more flexibility with respect to a communication mechanism comprising the reception of a first transmission and the subsequent sending of a second transmission in response to the first transmission.

According to an embodiment, a node for a radio communication network is proposed. The node is arranged for a communication mechanism comprising the reception of a first transmission and the subsequent sending of a second transmission in response to said first transmission. The node is furthermore arranged to perform a selecting process for selecting a relative timing for sending said second transmission from among a plurality of predetermined relative timing choices.

In accordance with this concept, the node, which in the context of the described communication mechanism may be the sending node of the first transmission or the sending node of the second transmission, is not limited to necessarily setting the timing for the sending of the second transmission in a predetermined way like in the prior art, but is capable of performing a selecting process for selecting a relative timing. The expression "relative timing" means that there is a plurality (i.e. two or more) of choices that are different with respect to one another in terms of their relative timing, i.e. if there are n relative timing choices $C_i$, where i=1, . . . , n, then the choices $C_i$ relate to a temporal hierarchy for the sending of the second transmission from fastest to slowest in the sense that the sending of the second transmission for choice $C_i$ will be earlier than the sending of the second transmission for choice $C_{i+1}$. Naturally, the representation of the choices can also be in the inverse, i.e. the choices $C_i$ may equally be presented as a temporal hierarchy from slowest to fastest in the sense that the sending of the second transmission for choice $C_i$ will be later than the sending of the second transmission for choice $C_{i+1}$. As an example, the concept may be embodied as a first choice $C_1$="fast" and a second choice $C_2$="slow", such that if choice $C_1$ is selected the sending of the second transmission will be earlier than if choice $C_2$ is selected.

As can be seen, the choices $C_i$ only relate to a relative timing with respect to one another, so that there is no limitation to associated actual time values. Furthermore, the actual time at which the second transmission is sent for each choice $C_i$ may vary from one instance of sending the second transmission to another instance of sending the second transmission, as long as the hierarchy of relative timings between different choices is maintained. Nonetheless, if desired, the concept can be embodied as a set of actual time values (e.g. difference times $\Delta T_i$ expressing a time difference between receiving the first transmission and sending the second transmission) associated with each choice $C_i$. However, the concept can equally well be embodied as a set of transmission mechanisms $M_i$, each of which is associated with a relative timing, thereby again providing a hierarchy of timing choices, e.g. from fastest to slowest or vice-versa, or ordered some other way.

Due to the described concept, a node of a radio communication network becomes more flexible, as the response time for reacting to the first transmission by sending the second transmission can be variably controlled.

According to a further embodiment, a method for operating a node of a radio communication network is proposed. The node is adapted for a communication mechanism comprising the reception of a first transmission and the subsequent sending of a second transmission in response to the first transmission. The method comprises a selecting process for selecting a relative timing for sending the second transmission from among a plurality of predetermined relative timing choices. According to another embodiment, a computer program is proposed, which is arranged to be executed on a node for a radio communication network, which comprises a computer program part arranged to perform the method. Furthermore, an embodiment can also be in the form of a computer program memory comprising the computer program.

According to a further embodiment, a method of operating a node for a radio communication network is proposed, the method comprising: receiving a first transmission;

selecting a relative timing for sending a second transmission in response to said first transmission, the relative timing being selected from among a plurality of predetermined relative timing choices; and sending a second transmission in accordance with the selected relative timing.

According to a further embodiment, a method of operating a node for a radio communication network is proposed, the method comprising: sending a first transmission to another node; and receiving a second transmission in response to said first transmission, wherein said method also comprises selecting a relative timing for sending said second transmission in response to said first transmission, the relative timing being selected from among a plurality of predetermined relative timing choices.

DESCRIPTION OF FIGURES

The following description of embodiments and preferred examples, which are to be understood as illustrative but not as limiting, will make reference to Figures, in which.

DETAILED DESCRIPTION OF EMBODIMENTS

Figure 1:
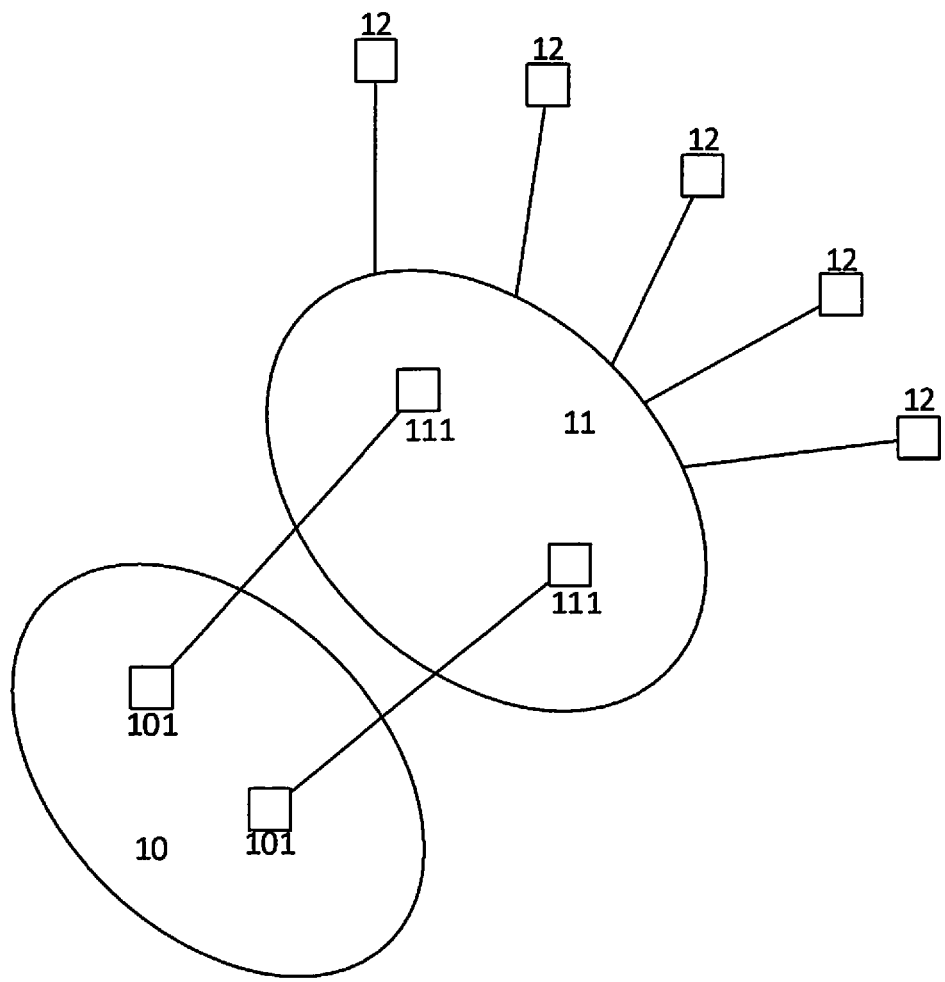
FIG. 1 shows a schematic representation of an example of a communication network.

FIG. 1 shows a schematic representation of a radio communication network 1, which is shown as having one or more core parts (or core networks) 10 and one or more access parts (or access networks) 11. The core part 10 is arranged to provide core control and management functions, while the access part 11 is arranged to let end nodes 12 access the radio communication network 1. The concept of core and access parts or networks is well known, such that a further description is not necessary. FIG. 1 furthermore shows core network nodes 101 and access network nodes 111. The presently described concept is applicable to any of the described nodes, i.e. can be embodied in an end node 12, an access node 111 and/or a network control node 101 of the core part 10. The concept is also not limited to any particular communication technology, such that it can be applied e.g. to 3G, 4G and/or 5G, and to any mixed architecture of different technologies.

An example of an end node is a user equipment (UE) or any other device arranged for accessing the network 1 via the access part 11. As such, an end node can be a radio device, a mobile phone, a mobile computer, a relay, but also any appropriately equipped sensor, actuator or other element designed for interconnectivity, e.g. IoT elements (IoT=Internet of Things). It should also be noted that although the end nodes are arranged to communicate through the network 1 both among each other and with nodes in other networks than network 1, e.g. with computer servers located e.g. in the Internet, end nodes may also be arranged for direct communication with one another. The end node herein can thus be any type of wireless device capable of communicating with an access node or another end node over radio signals. The end node may also be radio communication device, target device, device to device (D2D) UE, machine type UE or UE capable of machine to machine communication (M2M), a sensor equipped with UE, tablet, mobile terminal, smart phone, laptop embedded equipped (LEE), laptop mounted equipment (LME), USB dongles, Customer Premises Equipment (CPE) etc.

The access node can be any kind of network node which may comprise a radio network node such as base station (BS), radio base station, base transceiver station (BTS), base station controller (BSC), network controller, gNodeB, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (MSR BS).

The network control node can be any core network node, e.g. MME (Mobility Management Entity), SON (Self-Organizing Network) node, a coordinating node, positioning node, MDT (Minimization of Drive Tests) node, etc., or even an external node (e.g., 3rd party node, a node external to the current network 1), etc.

In the present description, the term "network node" is used for both access nodes and network control nodes. A network node may also comprise a test equipment.

Figure 2:
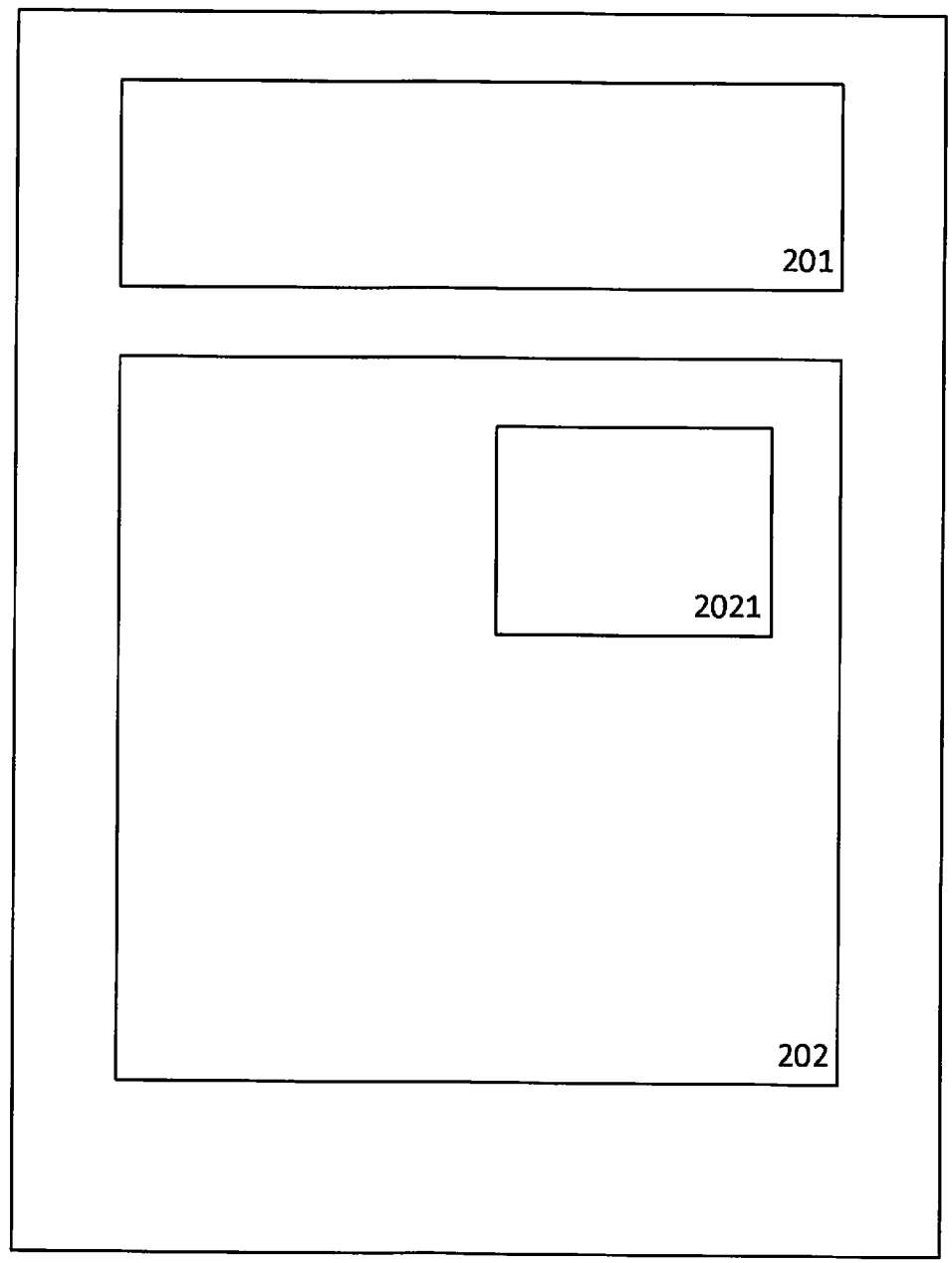
FIG. 2 shows a schematic representation of a node according to the presently described concept.

FIG. 2 shows a schematic representation of a node for a radio communication network according to the present concept. The node 20 comprises an interface part 201 for communication with other nodes. If the node 20 is an end node, e.g. end node 12 of FIG. 1, then the interface part 201 will be arranged for radio communication. If the node 20 is an access node, e.g. access node 111 of FIG. 1, the interface part will be arranged for radio communication with end nodes and for one or both of wire-bound and radio communication with network control nodes of the core network. If the node 20 is a network control node of the core network, e.g. network control node 101 of FIG. 1, the interface part will be arranged for one or both of wire-bound and radio communication with access nodes. The interface part 201 may furthermore be arranged to perform measurements relating to communicating conditions of the node, e.g. signal strength. However, node 20 may also have dedicated measuring equipment (not shown) or test equipment (not shown).

The node 20 furthermore comprises a control part 202 for controlling the operation of node 20, especially the communications and/or measurements performed by the interface part 201, but also the processing of data and information received. The control part can be provided in any suitable or desirable way, e.g. comprising one or more programmable processors and one or more memory and storage devices for storing control software and process data.

In accordance with the present concept, node 20 is arranged for a communication mechanism comprising the reception of a first transmission and the subsequent sending of a second transmission in response to said first transmission. An example of such a mechanism is where the first transmission comprises data and the second transmission comprises feedback information related to a receipt of that data. Various such feedback mechanisms are known, e.g. ARQ (Automatic Repeat reQuest) mechanisms or HARQ (Hybrid-ARQ) mechanisms. Such ARQ or HARQ mechanisms may involve the sending of ACK/NACK (Acknowledgment/Negative Acknowledgement) messages relating to the reception state of the data received in the first transmission, such that in exemplary cases of the present concept, the second transmission may comprise ACK/NACK information.

Other examples of feedback information that can be sent in the second transmission are CSI (Channel State Information) feedback or CQI (Channel Quality Indicators) feedback.

Another example of a communication mechanism comprising the reception of a first transmission and the subsequent sending of a second transmission in response to said first transmission is when the first transmission comprises resource allocation information and the second transmission comprises data, said data being sent over a resource allocated with the resource allocation information. In exemplary cases of the present concept, the first transmission may e.g. comprise scheduling information.

In the context of the presently described concept, the node 20 may be involved in different ways in the described communication mechanism. For example, the node 20 may be the receiver of the first transmission and the sender of the second transmission. If the node 20 is an end node, then the first transmission may comprise a DL (down link) data communication and the second transmission may comprise an UL (uplink) feedback message relating to the reception status of the DL data communication. Equally, the first transmission may be scheduling information sent on the DL and the second transmission may be an UL transmission in response to the received scheduling information. If the node 20 is an access node, then the first transmission may comprise an UL data communication and the second transmission may comprise a DL feedback message relating to the reception status of the UL data communication.

However, the node 20 may also be sender of the first transmission and the receiver of the second transmission. Or the node 20 may also be a network node sending control information to one or both of other nodes acting as sender and receiver of the communication mechanism comprising the reception of a first transmission and the subsequent sending of a second transmission in response to the first transmission.

Besides being applicable to UL or DL communication, the presently described concept is e.g. also applicable to sidelink communication or to communication between (or among) two or more end nodes, between (or among) two or more access nodes or between (or among) two or more network control nodes.

Furthermore, the presently described concept can be employed in connection with any desired type of carrier or channel for the first and second transmission, e.g. one or both can be carried over a control channel (e.g. a Physical Uplink Control Channel, PUCCH or Physical Downlink Control Channel, PDCCH) or a data channel (e.g. a Physical Downlink Shared Channel, PDSCH or Physical Uplink Shared Data Channel, PUSCH).

In accordance with the present concept, the control part 202 of node 20 may comprise an arrangement 2021 for performing a selecting process for selecting a relative timing for sending the second transmission from among a plurality of predetermined relative timing choices. The arrangement 2021 may be provided in any suitable or desirable way, e.g. as hardware, software or any suitable combination of hardware and software. For example, the arrangement 2021 may be a computer program part designed to be executed on a processor of the node 20.

The expression "relative timing" means that there is a plurality (i.e. two or more) of choices that are different with respect to one another in terms of their relative timing, i.e. if there are n relative timing choices $C_i$, where i=1, . . . , n, then the choices $C_i$ relate to a temporal hierarchy for the sending of the second transmission from fastest to slowest in the sense that the sending of the second transmission for choice $C_i$ will be earlier than the sending of the second transmission for choice $C_{i+1}$. Naturally, the representation of the choices can also be in the inverse, i.e. the choices $C_i$ may equally be presented as a temporal hierarchy from slowest to fastest in the sense that the sending of the second transmission for choice $C_i$ will be later than the sending of the second transmission for choice $C_{i+1}$. As an example, the concept may be embodied as a first choice $C_1$="fast" and a second choice $C_2$="slow", such that if choice $C_1$ is selected the sending of the second transmission will be earlier than if choice $C_2$ is selected. As another example, the concept may be embodied as a first choice $C_1$="fast", a second choice $C_2$="medium", and a third choice $C_3$="slow", such that if choice $C_1$ is selected the sending of the second transmission will be earlier than if choice $C_2$ is selected, and if choice $C_2$ is selected the sending of the second transmission will be earlier than if choice $C_3$ is selected.

As can be seen, the choices $C_i$ only relate to a relative timing with respect to one another, so that there is no limitation to associated actual time values. Furthermore, the actual time at which the second transmission is sent for each choice $C_i$ may vary may vary from one instance of sending the second transmission to another instance of sending the second transmission, as long as the hierarchy of relative timings between different choices is maintained. Nonetheless, if desired, the concept can be embodied as a set of actual time values (e.g. difference times $\Delta T_i$ expressing a time difference between receiving the first transmission and sending the second transmission) associated with each choice $C_i$. However, the concept can equally well be embodied as a set of transmission mechanisms $M_i$, each of which is associated with a relative timing, thereby again providing a hierarchy of timing choices from fastest to slowest or vice-versa.

Figure 3:
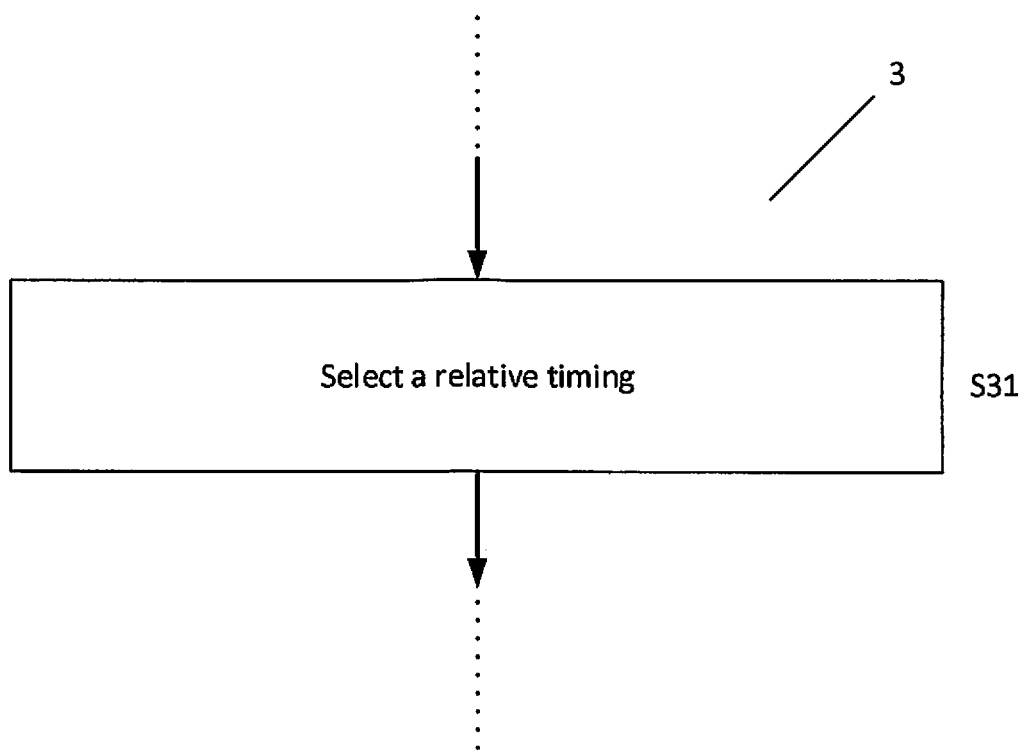
FIG. 3 shows a flow chart of a method embodiment.

FIG. 3 shows a flow chart of a basic method embodiment of the presently described concept. Within the method 3 for operating a node of a radio communication network, e.g. node 20 of FIG. 2, the node being adapted for a communication mechanism comprising the reception of a first transmission and the subsequent sending of a second transmission in response to the first transmission, there is provided a selecting process S31 for selecting a relative timing for sending said second transmission from among a plurality of predetermined relative timing choices.

Figure 4:
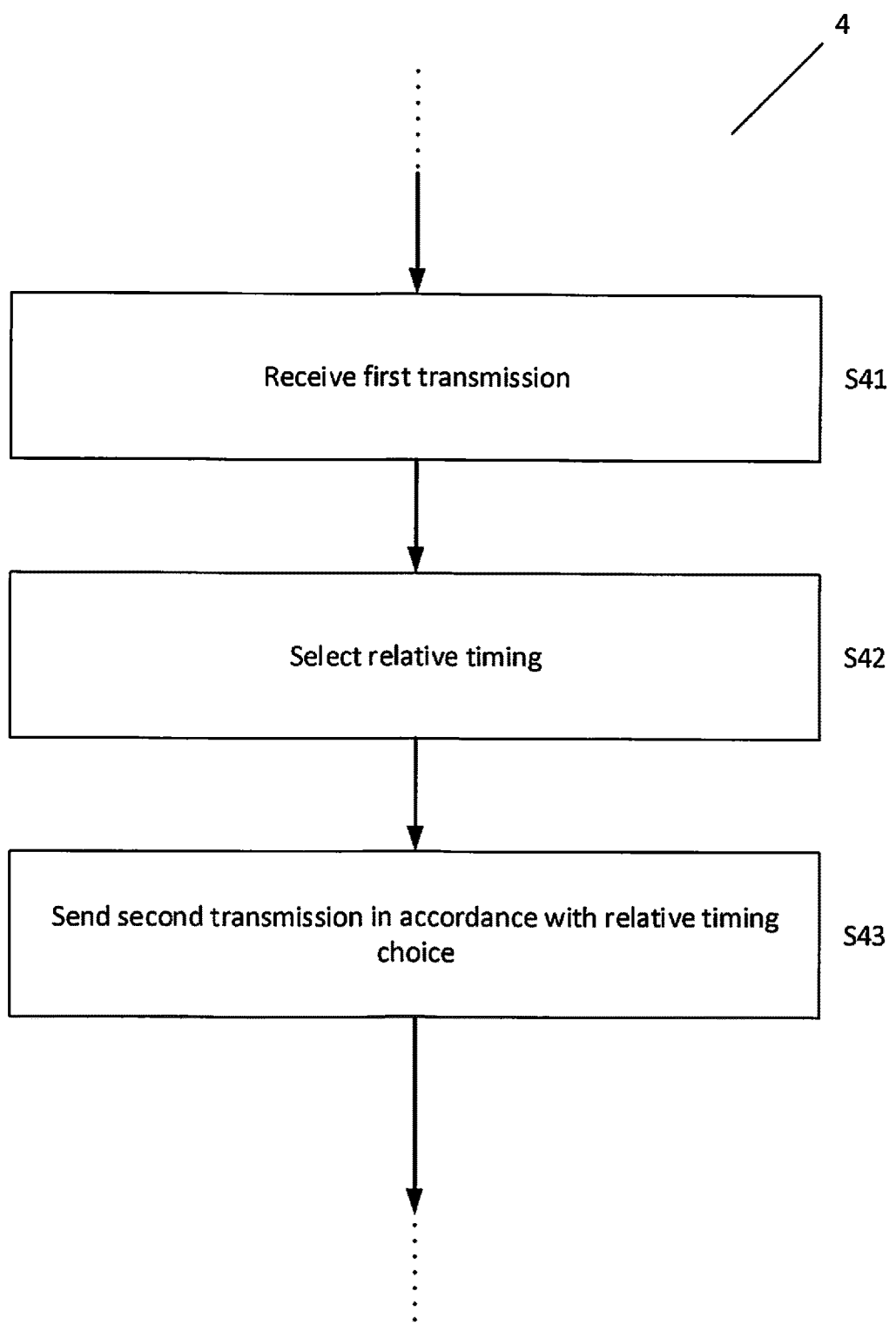
FIG. 4 shows a flow chart of another method embodiment.

An example of a further method embodiment is shown in the flow chart of FIG. 4. Within the method 4 for operating a node of a radio communication network, e.g. node 20 of FIG. 2, the node being adapted for a communication mechanism comprising the reception of a first transmission and the subsequent sending of a second transmission in response to the first transmission, there is provided a step S41 of receiving the first transmission, a selecting process S42 for selecting a relative timing for sending said second transmission from among a plurality of predetermined relative timing choices, and a step S43 of sending the second transmission in accordance with the selected relative timing.

Figure 5:
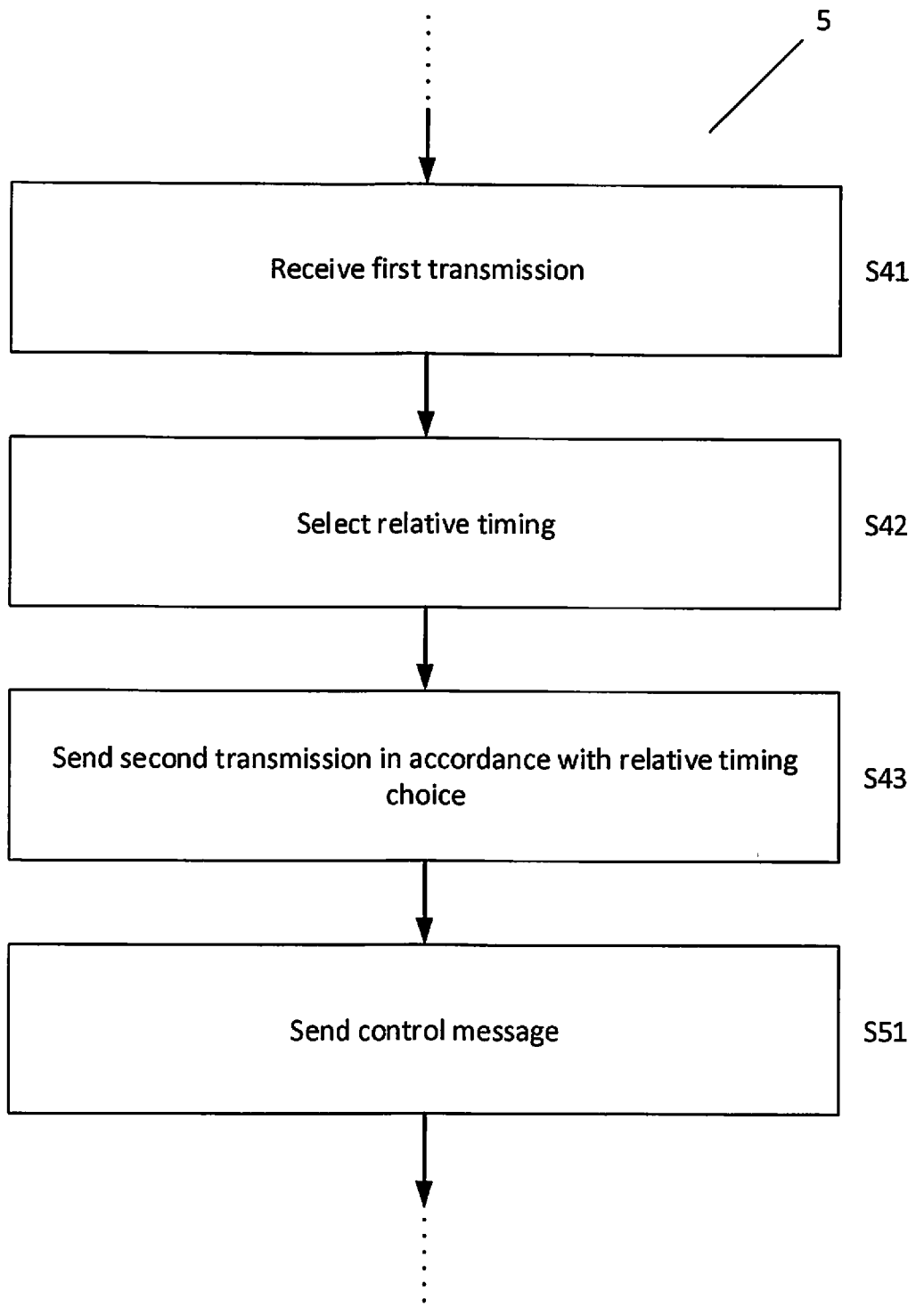
FIG. 5 shows a flow chart of another method embodiment.

The methods of FIG. 3 or 4 may additionally comprise a step subsequent to selection process S31 or S42 that comprises sending a control message indicating the selected relative timing for sending said second transmission to another node. An example is shown in FIG. 5, where step S51 comprises sending such a control message. Although step S51 is also subsequent to step S43 in this example, this is not necessary, as step S51 could also be prior to step S43 or in parallel thereto. The other node may be the direct communication partner in the transmission mechanism, i.e. the node that sent the first transmission, or it could be some other node, like a control node in the network 1. The control message may also be sent to a plurality of nodes. By virtue of the control message, the other node, e.g. the intended receiver of the second transmission, is made aware of the timing choice of the node sending the second transmission and can thus appropriately control its reception process. However, it is to be noted that it is not necessary that a control message be sent, as e.g. the node intended to receive the second transmission can be equipped to perform the same selecting process like S31 or S42, i.e. apply the same logic or algorithm and the same input information as the node executing method 3 or method 4, thereby deriving the same relative timing choice without receiving a control message.

The sending of the control message may be automatically done after each completion of the selecting process, but may also be triggered differently, e.g. upon request of another node or in dependence on an outside event.

Figure 6:
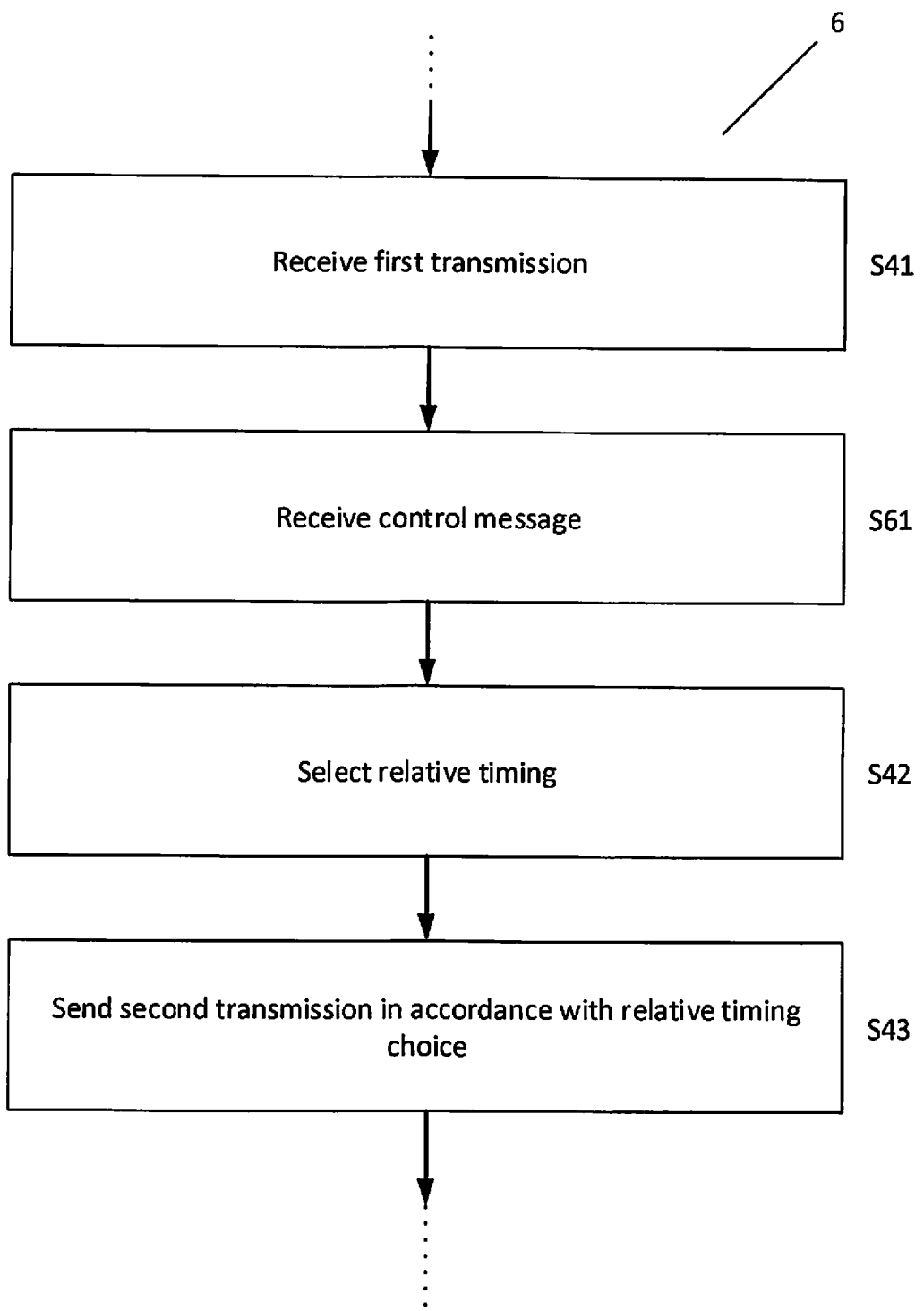
FIG. 6 shows a flow chart of another method embodiment.

The methods of FIG. 3, FIG. 4 or FIG. 5 may also comprise a step prior to selection process S31 or S42 that comprises receiving a control message (e.g. a DCI message, where DCI stands for Downlink Control Information) indicating the selected relative timing for sending said second transmission from another node. The control message could also be an RRC (Radio Resource Control Message). An example is shown in FIG. 6, where step S61 comprises receiving such a control message. Although step S61 is subsequent to step S41 in this example, this is not necessary, as step S61 could also be prior to step S41 or in parallel thereto. The selecting process S31 or S42 for selecting the relative timing for sending the second transmission can then take into account the received control message. The taking into account can be such that the control message is a command message and the selecting process then follows received command. The taking into account can, however, also be such that the control message is an information message informing the node of a suggestion of another node for the relative timing choice, where the selecting process S31 or S42 may or may not follow the suggestion, i.e. has the freedom to make a different choice. In the latter case it is preferable that the method 3, 4, 5, or 6 comprise a control message sending step like step S51 of FIG. 5, in order to indicate the selected relative timing choice to the one or more other nodes, e.g. as a command message or as an information message.

As already mentioned the control message may be one or both of a DCI message and an RRC message. Preferably a combination of RRC and DCI control message signalling is used. For example an RRC control message may configure a possible set of values (for example taking into account the other node's capabilities), and the DCI control message may select one of the configured options. More detailed examples of this are given in the following. The DCI message could select (e.g. via 1 or 2 bits) one out of 2 or 4 values for a response time configured by an RRC message. The values that RRC can configure could e.g. depend on numerology, especially the smallest possible value to configure. Response time could be the time between (end of) DL data transmission and PUCCH (HARQ feedback) transmission. Another example is the time between end-of-UL-grant and the start of UL transmission. Note furthermore that a given subcarrier spacing is an example of a numerology, and a given minimum response time, e.g. expressed as a number of symbols, is an example of a capability.

EXAMPLES

Example A

For 15 kHz subcarrier spacing, UE needs at least 1 OFDM symbol between end of DL data and start of PUCCH.

Example B

For 30 kHz subcarrier spacing, UE needs at least 2 OFDM symbols between end of DL data and start of PUCCH.

Example C

For 60 kHz subcarrier spacing and more, UE needs at least 4 OFDM symbols between end of DL data and start of PUCCH.

A configuration, e.g. via RRC, may comprise defining a set of possible relative timing selections in terms of a number of OFDM symbols, i.e. a first timing selection is expressed as $n_1$ OFDM symbols, a second timing selection is expressed as $n_2$ OFDM symbols, etc., where $n_i$ are numbers. If the selection control signalling (e.g. via DCI) is 1 bit, then the set of possible selections has two member $\{n_1, n_2\}$, if the selection control signalling (e.g. via DCI) is 2 bits, then the set of possible selections may have two to four members $\{n_1, n_2, n_3, n_4\}$, etc. The smallest number among the $n_i$ must be at least as large as the minimum response time indicated above, i.e. 1 for Example A, 2 for Example B, and 4 for Example C. Naturally, the smallest number may be larger than the minimum spacing. In this way a "slower" response time adjustment is possible. To give examples, in the case of a 1-bit selection signalling, a configuration for Example A could be $\{1, 2\}$, for Example B $\{2, 3\}$ and for Example C $\{4, 5\}$. A different, "slower" configuration could be $\{3, 6\}$ for Example A, $\{5, 8\}$ for Example B and $\{7, 10\}$ for Example C.

Note that for a given numerology, e.g. a 15 kHz subcarrier spacing, there can be different nodes (e.g. terminals) having different capabilities, e.g. one node having a minimum response time of 1 OFDM symbol and another node having a minimum response time of 3 OFDM symbols. The possible configurations then take these different capabilities into account accordingly, i.e. as explained above, the smallest number among the $n_i$ must be at least as large as the minimum response time.

Example D

For 15 kHz subcarrier spacing, UE needs at least 2 OFDM symbols between end of UL grant and start of UL transmission.

Example E

For 30 kHz subcarrier spacing, UE needs at least 3 OFDM symbols between end of UL grant and start of UL transmission.

Example F

For 60 kHz subcarrier spacing and more, UE needs at least 4 OFDM symbols between end of UL grant and start of UL transmission.

Similar to the explanation for Examples A-C, in the case of a 1-bit selection signalling, a configuration for Example D could be {2, 3}, for Example E {3, 4} and for Example F {4, 5}. A different, "slower" configuration could be {4, 6} for Example D, {6, 8} for Example E and {8, 10} for Example F.

Note that although these examples use the number of OFDM symbols as the expression of a time delay, this is only one possibility among many and other representations are possible, e.g. using absolute time expressed in microseconds or seconds.

Figure 7:
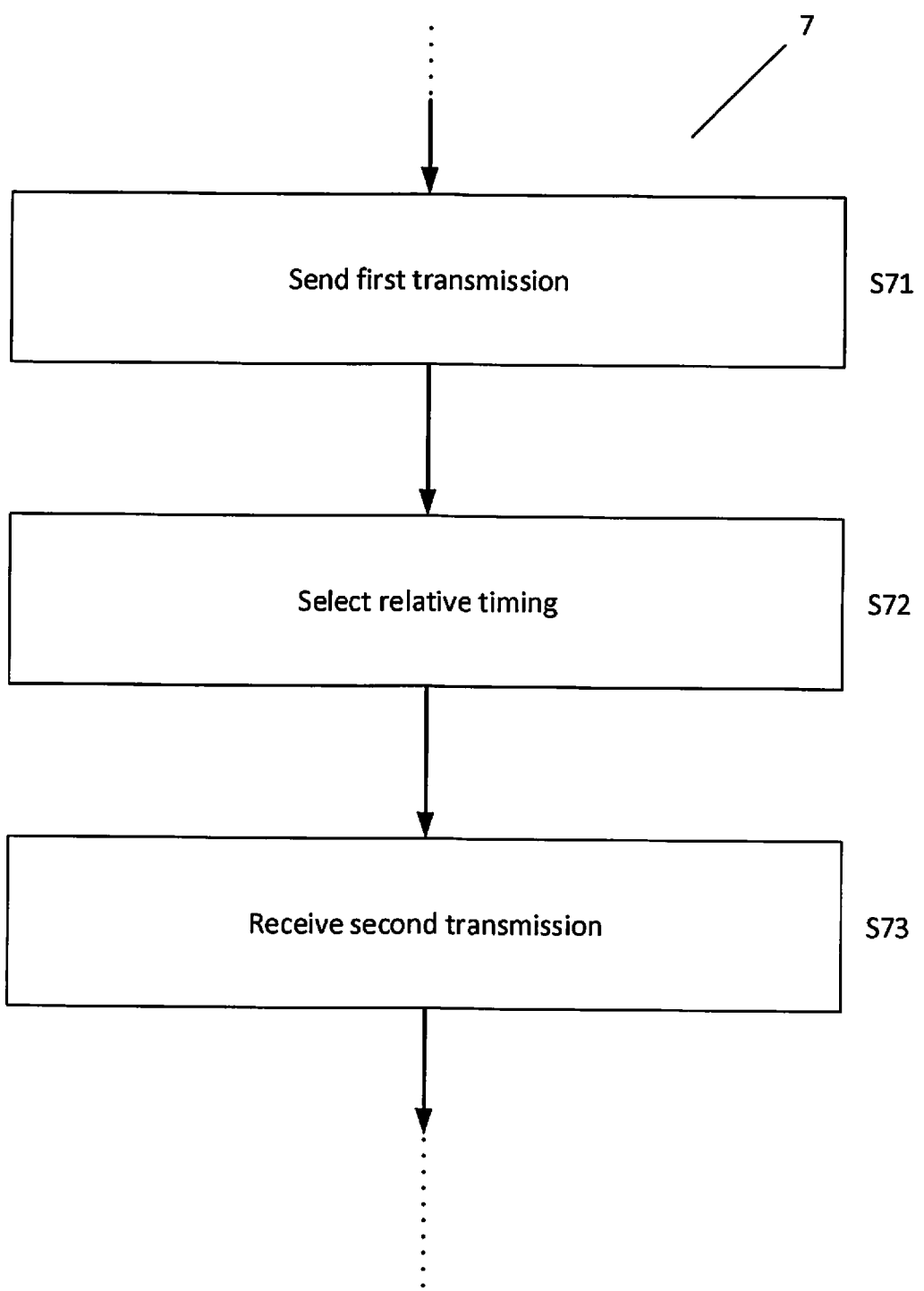
FIG. 7 shows a flow chart of another method embodiment.

A further example of a method embodiment is shown in the flow chart of FIG. 7. Within the method 7 for operating a node of a radio communication network, e.g. node 20 of FIG. 2, the node being adapted for a communication mechanism comprising the reception of a first transmission and the subsequent sending of a second transmission in response to the first transmission, there is provided a step S71 of sending the first transmission, a selecting process S72 for selecting a relative timing for sending said second transmission from among a plurality of predetermined relative timing choices, and a step S73 of receiving the second transmission. The node executing method 7 may control the reception process for receiving the second transmission in accordance with the selected relative timing choice.

The methods of FIGS. 3 and 7 may additionally comprise a step subsequent to process S31 or S71 of sending a control message indicating the selected relative timing of process S31 or S72 to one or more other nodes, especially the node to which the first transmission is sent. The control message may be in the form of a command message instructing the other node(s) to select the same relative timing choice, or in the form of an information message comprising the selection made by process S31 or S72 as a suggestion for the relative timing choice to be made in the other node(s).

The methods of FIGS. 3 and 7 may furthermore additionally comprise a step prior to process S31 or S72 of receiving from another node a control message indicating a selected relative timing choice, especially from the node to which the first transmission is sent. The control message may be in the form of a command message instructing the node running method 7 to select the same relative timing choice in process S31 or S72, or in the form of an information message comprising a suggestion for the relative timing choice to be made in the process S31 or S72.

The operating methods of FIGS. 3-7 will generally comprise further conventionally known steps and processes belonging to the operation of a communication node, as indicated by the dotted lines in the figures, but these are not described further, as they are not pertinent to the presently described concept.

A node according to the presently described concept, e.g. node 20 as shown FIG. 2, may furthermore be arranged to send information associated with the node's capability of supporting one or more of said plurality of predetermined relative timing choices to one or more other nodes. For example, the information associated with the node's capability of supporting one or more of the plurality of predetermined relative timing choices may comprise information on one or more numerologies supported by the node. Accordingly, the methods of FIGS. 3 to 7 may comprise anywhere within said methods a step of sending information associated with the node's capability of supporting one or more of said plurality of predetermined relative timing choices to another node, preferably prior to the selecting process S31, S42 or S72, and more preferably prior to engaging in the communication mechanism comprising the reception of a first transmission and the subsequent sending of a second transmission in response to said first transmission, i.e. prior to the steps S41 or S71.

A node according to the presently described concept, e.g. node 20 as shown FIG. 2, may additionally or alternatively be arranged to receive from another node information associated with the other node's capability of supporting one or more of said plurality of predetermined relative timing choices. Accordingly, the methods of FIGS. 3 to 7 may comprise anywhere within said methods a step of receiving from another node information associated with the other node's capability of supporting one or more of the plurality of predetermined relative timing choices, preferably prior to the selecting process S31, S42 or S72, and more preferably prior to engaging in the communication mechanism comprising the reception of a first transmission and the subsequent sending of a second transmission in response to said first transmission, i.e. prior to the steps S41 or S71. This capability information may then be used for selecting relative timing choices in subsequent instances of performing process S31, S42 or S72, i.e. the selecting process takes into account the received information associated with the other node's capability of supporting one or more of said plurality of predetermined relative timing choices, when selecting said relative timing for sending said second transmission.

The criteria or dependencies that the selecting arrangement 2021 or the selecting process S31, S42 or S72 employ for selecting a relative timing choice may be chosen in any suitable or desirable way. According to a preferred embodiment, the selecting process is arranged to take into account information associated with one or more communicating conditions of one or both of the nodes involved in the communication mechanism comprising the reception of a first transmission and the subsequent sending of a second transmission in response to said first transmission, i.e. the node receiving the first transmission and sending the second transmission and/or the node sending the first transmission and receiving the second transmission. The taking into account of the information associated with one or more communicating conditions may be direct in the sense that the node having the selecting arrangement or performing the selecting process directly processes the information associated with one or more communicating conditions in the selection procedure, or may be indirect in the sense that a control message (such as the control message S61 described above in connection with FIG. 6) indicating the selected relative timing was generated in a process directly taking into account the information associated with the one or more communicating conditions, but the node having the selecting arrangement or performing the selecting process only receives the control message and then simply follows a command for timing selection comprised in the control message. The taking into account of the information associated with one or more communicating conditions of one or both of the nodes involved in the communication mechanism can also be combined with the previously mentioned taking into account of the other node's capabilities of supporting one or more of the plurality of predetermined relative timing choices.

The communication conditions may relate to one or both of the transport of the first transmission (e.g. the signal or carrier carrying the first transmission and/or the channel carrying the first transmission and/or the bearer carrying the first transmission) and the transport of the second transmission (e.g. the signal or carrier carrying the second transmission and/or the channel carrying the second transmission and/or the bearer carrying the second transmission).

The communicating conditions may comprise a set of one or more physical layer settings provided for said communication mechanism. An example of such a set is a numerology.

Examples of a numerology are one or more of subcarrier spacing, cyclic prefix, channel spacing, number of RBs (radio bearers) within a given bandwidth, symbol length, subframe length, slot length, etc. The selecting process could thus take into account one or both of the used numerology or numerologies and the capability of the other node to support a timing choice given the used numerology or numerologies.

The communicating conditions may furthermore comprise a carrier frequency.

The communicating conditions may furthermore comprise any suitable communication quality indicator, such as the coverage level. The communication quality may be assessed in any suitable or desirable way. For example, in the communication between an end node and an access node, an indicator (e.g. the coverage level) can be determined by measuring one or more radio measurement values associated with the communication quality, where these values may be compared to a set of thresholds, each threshold corresponding to a given coverage level. The term "radio measurement" may refer to any measurement performed on radio signals. Radio measurements can be absolute or relative. Radio measurements can be e.g. intra-frequency, inter-frequency, CA, etc. Radio measurements can be unidirectional (e.g., DL or UL) or bidirectional (e.g., RTT, Rx-Tx, etc.). Some examples of radio measurements: timing measurements (e.g., TOA (Time of Arrival), timing advance, RTT (Round Trip Time), RSTD (Reference Signal Time Difference), SSTD (Synchronization Signal Time Difference), Rx-Tx time difference, propagation delay, etc.), angle measurements (e.g., angle of arrival), power-based measurements (e.g., received signal power, RSRP (Reference Symbol Received Power), received signal quality, RSRQ (Reference Symbol Received Quality), SINR, SNR, path loss, interference power, total interference plus noise, RSSI, noise power, etc.), cell detection or identification, beam detection or identification, system information reading (e.g. acquisition of MIB and/or one or more SIBs etc), acquisition of cell global ID (CGI), RLM, channel availability (e.g., when the channel is accessed based on a CSMA-like or LAA-like scheme), load estimation or load measurement, channel occupancy measurement, CSI etc. Examples of CSI measurements are CQI, PMI, RI, CRI etc.

The communicating conditions may furthermore comprise one or both of the distance and the speed difference between the two nodes involved in the communication mechanism comprising the reception of a first transmission and the subsequent sending of a second transmission in response to said first transmission.

The radio communication network may be a cellular network, and the communicating conditions may comprise a cell range of a cell in which one or both of the nodes involved in the communication mechanism comprising the reception of a first transmission and the subsequent sending of a second transmission in response to said first transmission are located.

The communicating conditions may furthermore comprise a temporal characteristic associated with the communication between the two nodes involved in the communication mechanism comprising the reception of a first transmission and the subsequent sending of a second transmission in response to said first transmission. As such, the information associated with one or more communicating conditions may comprise one or more of a time of arrival, a timing advance, a round-trip delay time, a reference signal time difference, a synchronization signal time difference, an Rx-Tx time difference, and a propagation delay.

In accordance with the presently described concept, the selection process may take into account one or more measurement results. A measurement may be, e.g., one or more radio measurements. In another example, a measurement may be the evaluation of a statistical measure (e.g., probability of an error/failure/successful operation). A measurement result may comprise a result of one or more measurements, i.e. the processing of different measurement values into processed values also generates a measurement result.

In association with the relative timing choice, there may be a timing relation related to the time difference or response time $\Delta T$ between the reception of the first transmission and the sending of the second transmission. The timing relation may be expressed in any suitable and desirable way in terms of a given number of time resources, e.g. as physical time (measured e.g. in seconds), as a number of (one or more) portions of a symbol, as a number of (one or more) symbols, as a number of (one or more) time slots, as a number of (one or more) subframes, as a number of (one or more) slots, as a number of (one or more) radio frames, as a number of (one or more) TTIs, as a number of (one or more) interleaving times, etc.

In accordance with the presently described concept, the selected relative timing choice may be applied in the same way to a group of different types of communications each falling under a respective communication mechanism comprising the reception of a first transmission and the subsequent sending of a second transmission in response to said first transmission. For example, a first type of communication may relate to a sending HARQ feedback in response to receiving a data transmission, a second type of communication may relate to sending a CSI feedback in response to receiving a data or reference signal transmission, and a third type communication may relate to sending data in response to receiving a resource allocation. For example, the same timing relation between the reception of a first signal at the radio node and the transmission of a second signal by the radio node may be applied for all types of responses grouped together e.g. same for HARQ, CSI, UL data transmission etc.

The definition of such a group may be done in any suitable or desirable way, e.g. cover all types of communications fulfilling the definition of a communication mechanism comprising the reception of a first transmission and the subsequent sending of a second transmission in response to said first transmission. However, it also possible to define a smaller group for common application of the relative timing choice, e.g. the timing relation between the reception of a first signal at the node and the transmission of a second signal by the node may be the same for at least the types of response signals which are transmitted concurrently e.g.

same for HARQ and CSI if they are transmitted at the same time or in the same channel/radio resources.

However, in accordance with the presently described concept, the selection of a relative timing choice may also be different for different types of communications falling under a respective communication mechanism comprising the reception of a first transmission and the subsequent sending of a second transmission in response to said first transmission. In other words, in the context of the above example of a first type of communication relating to a sending HARQ feedback in response to receiving a data transmission, a second type of communication relating to sending a CSI feedback in response to receiving a data or reference signal transmission, and a third type communication relating to sending data in response to receiving a resource allocation, an individual relative timing choice (and possibly corresponding individual timing relation) may be made for each individual type of communication.

Now further examples of applying the presently described concept will be described.

Receiving Node Examples

In a node involved in the communication mechanism comprising the reception of a first transmission and the subsequent sending of a second transmission in response to said first transmission and acting as the receiving node of the first transmission (referred to as "receiving node" in the following), methods of the following kind may be applied.

Step 0 (optional): Indicating to another node the receiving node's capability related to the support of flexible response transmission times and/or mechanisms Step 1: Determining a time of receiving or expecting one or more radio signals/channels for which a response (e.g. feedback) needs to be transmitted Step 2: Selecting one from a plurality of the relative timing choices, e.g. associated with corresponding response transmission times or mechanisms, depending on one or more communication conditions, e.g. one or more of: numerology, carrier frequency, cell range, measurement, and threshold or condition Step 2a (optional)_Indicating to another node the selected choice Step 3: Sending at least one feedback to another radio node, based on the selected choice.

Different possibilities for steps 0-3 will be described in the following.

Step 0

In this step, the receiving node may indicate to another node (e.g., UE, radio network node, core network node) the receiving node's capability related to the support of flexible response transmission time and/or mechanism.

In a further embodiment, the capability may further comprise or be indicative of the response transmission time or mechanism options supported by the receiving node.

The capability may be provided upon a request from the other node or in an unsolicited way, e.g., upon a triggering condition, event, receiving a triggering message from another node, etc.

Step 1

In this step, the receiving node may determine a time of receiving or expecting one or more radio signals/channels for which a response is to be transmitted. For example, a signal/channel is received in a time resource#K (e.g. subframe/slot#N and/or symbol#M).

The determining may be, e.g., based on the actual reception time, scheduling information, pre-defined rule, etc.

Step 2

In this step, the receiving node may select one from a plurality of relative timing choices, e.g. feedback transmission times or mechanisms, directly or indirectly depending on one or more of: numerology, carrier frequency, coverage level, cell range, measurement, and threshold or condition. Any of the above parameters and/or the selection method may be obtained based on, e.g., Measurement,
Pre-defined rule
History
Statistics
Message or configuration from another node One example of plurality of relative timing choices comprises:

Short delay (aka faster response) e.g. response sent in time resource K+1,
Long delay (aka slower response) e.g. response sent in time resource K+4.

Another example of plurality of response transmission time comprises:

Short delay (aka faster response) e.g. response sent in time resource K+1,
Intermediate delay (aka moderate response) e.g. response sent in time resource K+3,
Long delay (aka slower response) e.g. response sent in time resource K+6.

One example of plurality of feedback transmission mechanisms $M_i$ comprises e.g. any two or more of:

Fast ACK/NACK feedback channel which is transmitted at the end of a DL-heavy slot (same slot or slot in near future),
Alternative feedback is another feedback mechanism that is transmitted over a longer transmission duration in an UL slot,
Legacy-like feedback (e.g., relatively long feedback)

In a further embodiment, the receiving node may also indicate to another node (e.g., the node which is going to receive the response or to another UE, radio network node, or core network node) the selected choice, e.g. feedback transmission time and/or mechanism. The indication may be, e.g., upon a request or upon triggering condition or event.

For example, one or any combination may apply:

First choice, e.g. first response transmission time and/or mechanism may be selected for a numerology comprised in a first set of numerologies, second choice, e.g. response transmission time and/or mechanism may be selected for a numerology comprised in a second set of numerologies, e.g.:

A faster response (mechanism) may be selected for a subcarrier spacing of the reception and/or feedback below a first threshold A slower response (mechanism) may be selected for a subcarrier spacing of the reception and/or response above a second threshold Note that depending on implementation also the opposite can occur, i.e. a faster response (mechanism) may be selected for a subcarrier spacing of the reception and/or feedback above a first threshold and a slower response (mechanism) may be selected for a subcarrier spacing of the reception and/or response below a second threshold.

First choice, e.g. first response transmission time and/or mechanism may be selected for a carrier frequency comprised in a first set of carrier frequencies, second choice, e.g. second response transmission time and/or mechanism may be selected for a carrier frequency comprised in a second set of carrier frequencies, e.g.:
- A faster response (mechanism) may be transmitted on a carrier frequency of the reception and/or response below a first threshold
- A slower response (mechanism) may be transmitted on a carrier frequency of the reception and/or response above a second threshold First choice, e.g. first response transmission time and/or mechanism may be selected for a cell range comprised in a first set of cell ranges, second choice, e.g. second response transmission time and/or mechanism may be selected for a cell range comprised in a second set of cell ranges, e.g.:
- Where the first set of cell ranges comprises cell ranges below a threshold, and the second set of cell ranges comprises cell ranges above a threshold First choice, e.g. first response transmission time and/or mechanism may be selected for a first measurement result, second choice, e.g. second response transmission time and/or mechanism may be selected for a second measurement result, e.g.,
- The first measurement result is received signal strength or quality is above a threshold and/or a timing measurement value is below a threshold, the second measurement result is received signal strength or quality is below a threshold and/or a timing measurement value is above a threshold.
- The first measurement result is channel availability is above a threshold, the second measurement result is channel availability is below a threshold
- The first measurement result is load is above a threshold, the second measurement result is load is below a threshold More specifically in one example the receiving node may select the first choice, e.g. first response transmission time and/or mechanism if the path loss with respect to other radio node is below path loss threshold and the propagation delay between the radio node and the other radio node is also below propagation delay threshold, otherwise the radio node may select the second choice, e.g. second response transmission time and/or mechanism. The path loss threshold and propagation delay threshold may be pre-defined or configured at the radio node by controlling node. The controlling node may also be the other radio node to which the response is sent by the receiving node.

In yet another example if the receiving node cannot reliably perform one or more radio measurements used for selecting the choice, e.g. response transmission time and/or mechanism then the receiving node may select a reference choice, e.g. reference response transmission time and/or mechanism or a pre-defined one. The measurement may be considered unreliable if the accuracy is worse than a threshold e.g. if pathloss measurement accuracy is worse than ±6 dB. In one example the reference response time can be the longest of the possible response times. In another example the reference response time can be an intermediate value out of the possible response times. In yet another example the reference response time can be configured at the receiving node by another node.

In the above examples the first response transmission time and the second response transmission time may correspond to shorter response delay and longer response delay respectively.

Step 3

In this step, the receiving node may send at least one response to another radio node, based on the selected choice, e.g. response transmission time and/or mechanism.

The sending may further comprise sending a response via a physical channel (e.g., UL control channel).

Sending Node Examples

In a node involved in the communication mechanism comprising the reception of a first transmission and the subsequent sending of a second transmission in response to said first transmission and acting as the sending node of the first transmission (referred to as "sending node" in the following), methods of the following kind may be applied.

Step 0 (optional): Receiving from a receiving node an indication of its capability related to the support of flexible response transmission times and/or mechanisms Step 1: Selecting one from a plurality of the relative timing choices, e.g. feedback transmission times and/or mechanisms for the receiving node, depending on one or more of: numerology, carrier frequency, coverage level, cell range, measurement, and threshold or condition Step 2 (optional): Controlling the receiving node's selection of the relative timing choice, e.g. associated with a feedback transmission time and/or mechanism, based on the selection result Step 3 (optional): Adapting resource scheduling or at least one parameter related to the response transmission and/or for the radio signals/channels for which the response is to be sent, based on the selection result Step 4: Receiving one or more responses from the receiving node, based on the selection result Different possibilities for steps 0-4 will be described in the following.

Step 0

In this step, the sending node may receive from a receiving node an indication of its capability related to the support of flexible feedback transmission times and/or mechanisms. See also Step 0 in the previous description of receiving node embodiments.

The received capability information may further be used in the next steps, e.g., to ensure that the selected relative timing choice e.g. feedback transmission time and/or mechanism is supported by the receiving node.

Step 1

In this step, the sending node may select one from a plurality of the relative timing choices, e.g. feedback transmission times and/or mechanisms for the receiving node, depending on one or more of: numerology, carrier frequency, coverage level, cell range, measurement, and threshold or condition.

The selection methods, principles and rules may be similar to those described for the receiving node.

In addition, the selection may be based on the measurement results received from the receiving node and/or measurement results obtained at the sending node (e.g., based on radio transmissions by the receiving node).

Step 2

In this step, the sending node may control the receiving node's selection of the relative timing choice e.g. feedback transmission time and/or mechanism, based on the selection result. This can be done by any suitable or desirable type of control message, e.g. via DCI (Downlink Control Information). Equally, the control message could be an RRC (Radio Resource Control) message, e.g. semi-statically configured. RRC and DCI signaling can be used in combination, e.g. an RRC control message configures a possible set of values (for example taking into account the other node's capabilities), and the DCI control message selects one of the configured options.

The controlling may comprise, e.g., sending to the receiving node one or more parameters based on the selection result to enable the receiving node to select or determine the relative timing choice, e.g. response transmission time and/or mechanism based on the result of the selection in the sending node.

Step 3

In this step, the sending node may adapt resource scheduling or at least one parameter related to the response transmission and/or for the radio signals/channels for which the response is to be sent, based on the selection result.

For example, a faster scheduling may be used if a faster response (e.g. feedback or UL transmission) is selected. Another example is that a DL transmission may stop early in a slot (see FIG. 11), to enable transmission on feedback at the end of the slot duration.

Step 4

In this step, the sending node may receive one or more responses from the receiving node, based on the selection result.

The presently described concept can be employed in the context of any communication mechanism comprising the reception of a first transmission and the subsequent sending of a second transmission in response to said first transmission. According to a preferred embodiment, the concept is applied in the context of the introduction of the NR or 5G architecture, aspects of which will be described in the following.

Figure 8:
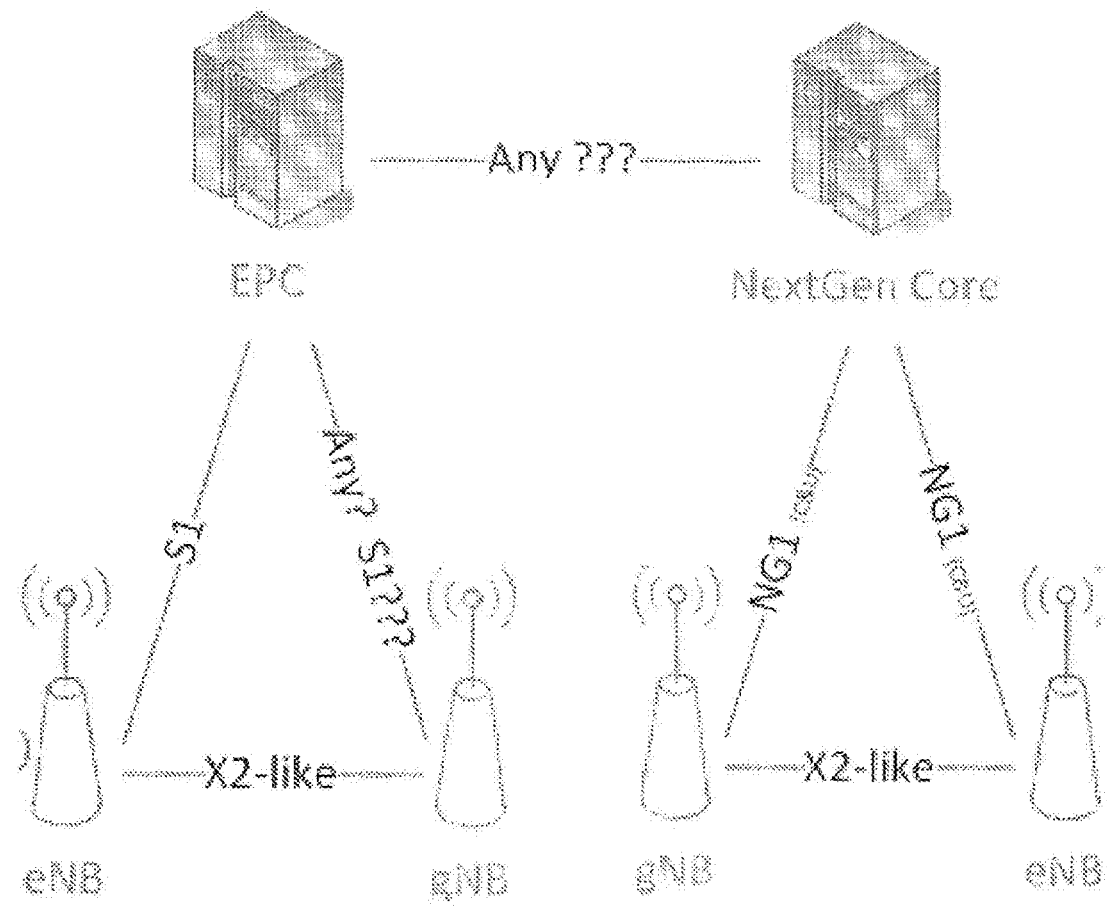
FIG. 8 shows a schematic example of NR architecture.
Figure 9:
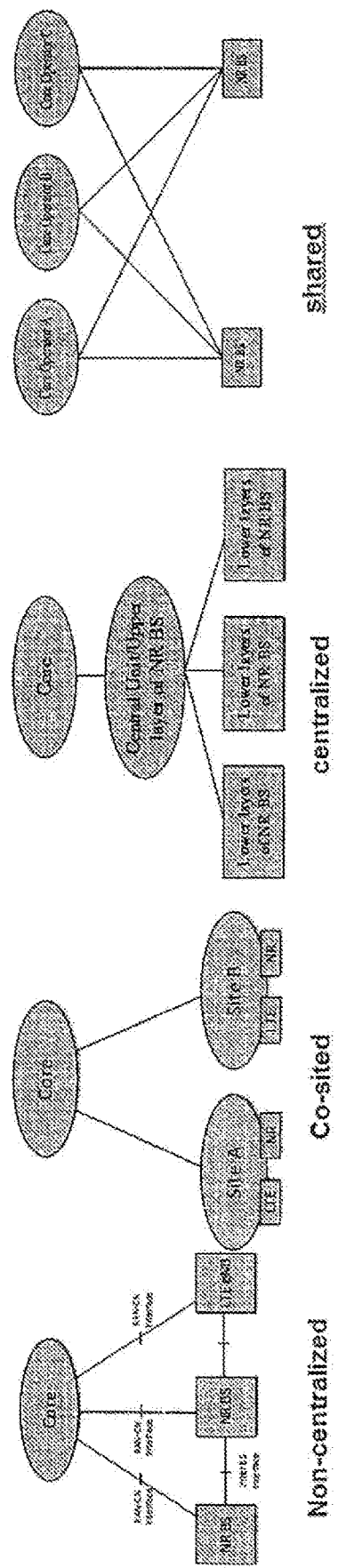
FIG. 9 shows NR deployment examples.

NR (a.k.a. 5G or Next Generation or New Radio) architecture is being discussed in 3GPP and the current concept is illustrated in FIG. 8, where eNB denotes LTE eNodeB, gNB denotes NR Base Station (NR BS) (one NR BS may correspond to one or more transmission/reception points), and the lines between the nodes illustrate the corresponding interfaces which are under discussion in 3GPP. Further, FIG. 9 illustrates deployment scenarios with NR BS which are discussed in 3GPP.

The NR radio frame structure is being discussed for NR. However, it has been agreed already that multiple numerologies, multiplexed in time and/or frequency will be supported in NR. Furthermore, the radio frame may consist of a different number of smaller time units, e.g., symbols.

For LTE, the term "numerology" includes, e.g., the following elements: frame duration, subframe or TTI duration, slot duration, subcarrier spacing, cyclic prefix length, number of subcarriers per RB, number of RBs within the bandwidth (different numerologies may result in different numbers of RBs within the same bandwidth).

The exact values for the numerology elements in different radio access technologies are typically driven by performance targets, e.g., performance requirements impose constraints on usable subcarrier spacing sizes, e.g., the maximum acceptable phase noise sets the minimum subcarrier bandwidth while the slow decay of the spectrum (impacting filtering complexity and guardband sizes) favors smaller subcarrier bandwidth for a given carrier frequency, and the required cyclic prefix sets the maximum subcarrier bandwidth for a given carrier frequency to keep overhead low.

However, the numerology used so far in the existing RATs is rather static and typically can be trivially derived by the UE, e.g., by one-to-one mapping to RAT, frequency band, service type (e.g., MBMS), etc.

In LTE downlink which is OFDM-based, the subcarrier spacing is 15 kHz for normal CP and 15 kHz and 7.5 kHz (i.e., the reduced carrier spacing) for extended CP, where the latter is allowed only for MBMS-dedicated carriers.

The support of multiple numerologies has been agreed for NR, which can be multiplexed in the frequency and/or time domain for the same or different UEs.

In NR, which is to be based on OFDM, multiple numerologies will be supported for general operation. A scaling approach (based on a scaling factor $2\hat{}n$, $n \in N_0$) is considered for deriving subcarrier spacing candidates for NR. Values for subcarrier bandwidths currently discussed include among others 3.75 kHz, 15 kHz, 30 kHz, 60 kHz. The numerology-specific slot durations can then be determined in ms based on the subcarrier spacing: subcarrier spacing of $(2^m*15)$ kHz gives exactly $\frac{1}{2}^m$ X ms for a slot that is X ms in the 15 kHz numerology, where X may e.g. be 0.5 or 1.

Subcarrier spacings of at least up to 480 kHz are currently being discussed for NR (the highest discussed values correspond to millimeter-wave based technologies). It was also agreed that multiplexing different numerologies within a same NR carrier bandwidth is supported, and FDM and/or TDM multiplexing can be considered. It was further agreed that multiple frequency/time portions using different numerologies share a synchronization signal, where the synchronization signal refers to the signal itself and the time-frequency resource used to transmit the synchronization signal. Yet another agreement is that the numerology used can be selected independently of the frequency band although it is assumed that a very low subcarrier spacing will not be used at very high carrier frequencies.

Figure 10:
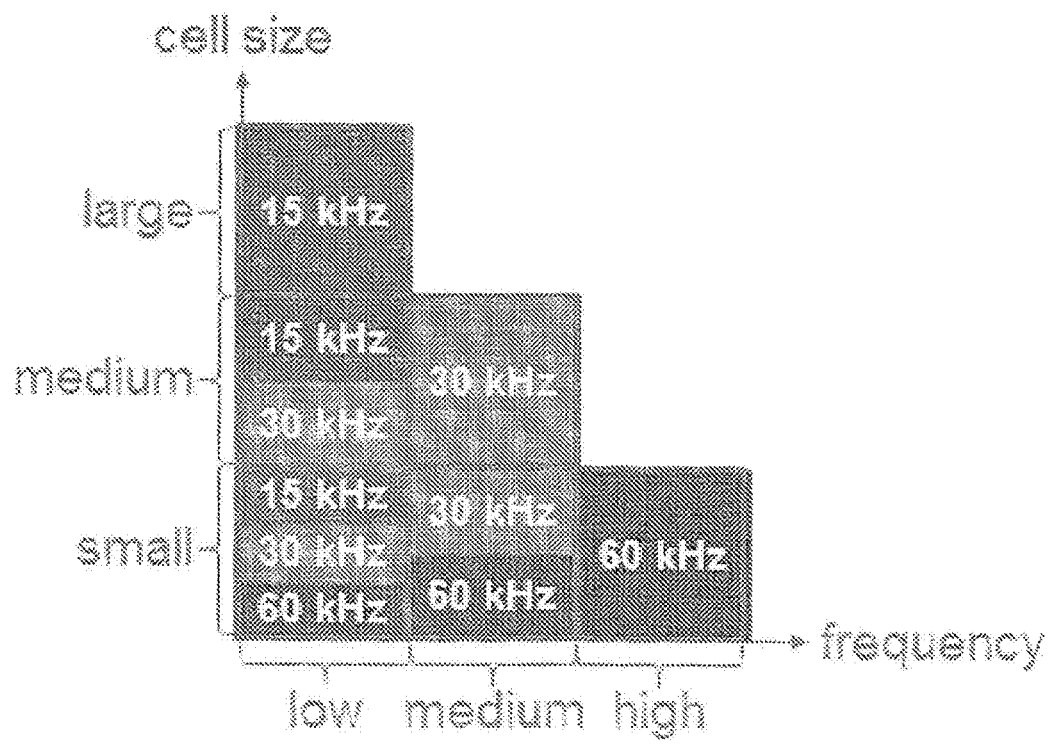
FIG. 10 shows example subcarrier spacing candidate configurations for NR.

In FIG. 10, some candidate carrier spacings are illustrated with respect to the frequency and cell range. In Table 1, further details are provided on corresponding time durations for some candidate carrier spacings.

TABLE 1

| Subcarrier spacing in kHz | OFDM symbol duration in µs | Cyclic prefix length in µs | Total symbol duration in µs |
|---|---|---|---|
| 15 | 66.67 | 4.76 | 71.43 |
| 30 | 33.33 | 2.38 | 35.71 |
| 60 | 16.67 | 1.19 | 17.86 |
| 120 | 8.33 | 0.60 | 8.93 |

ACK/NACK feedback is used, e.g., in LTE, by the intended receiving node to inform a sending node that its transmission has been or has not been successfully received. The ACK/NACKs may be transmitted in response to DL by UE (via UL control channel or data channel) or eNB (via PHICH) in response to UL, respectively. For the HARQ feedback transmitted by the UE in UL, in general, it is expected that in FDD the UE transmits the feedback in subframe (n+4) for the DL reception in subframe n. For TDD, the relation is also pre-defined but depends on the TDD configuration. In HD-FDD, the timing relation between reception of data at the UE and transmission of HARQ A/N in the uplink is also pre-defined e.g. in NB-IoT the ACK/NACK is sent in subframe n+12.

For NR (or at least for some configurations/setups), one of the important functional requirements is a reduced latency, which may also imply, e.g., faster feedback. Several solutions enabling faster feedback were discussed.

Figure 11:
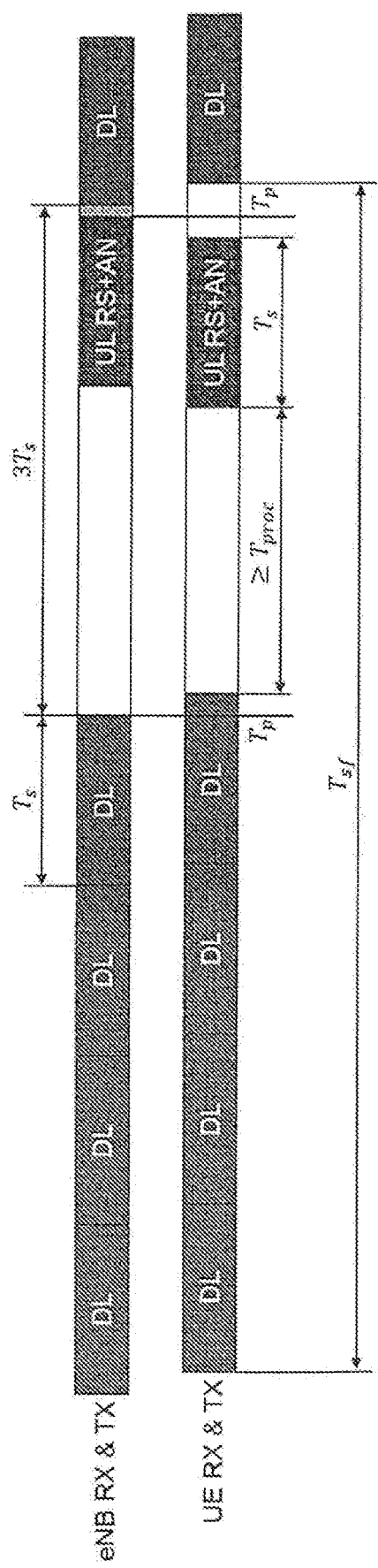
FIG. 11 shows an example of a DL-heavy slot with ACK/NACK feedback at the end.

For example, it is foreseen that an ACK/NACK feedback of a transport block sent in DL during a slot can already be sent back at the end of the same slot, see FIG. 11, where $T_{proc}$ is the UE processing time (the time required in the UE to decode and prepare the ACK/NACK), and $T_p$ is the propagation time. One OFDM symbol incl. cyclic prefix is $T_S$ long. Note that a slower version of the fast ACK/NACK feedback is also discussed in 3GPP where the UL slot depicted in FIG. 11 does not contain ACK/NACK feedback of the DL in the current slot but of a previous slot.

FIG. 11 shows a DL-heavy slot with ACK/NACK feedback at the end. The duration between DL-end UL-start is determined by the UE processing time. Three OFDM symbol durations are needed to fit the UL channel structure including required processing time in the UE.

Figure 12:
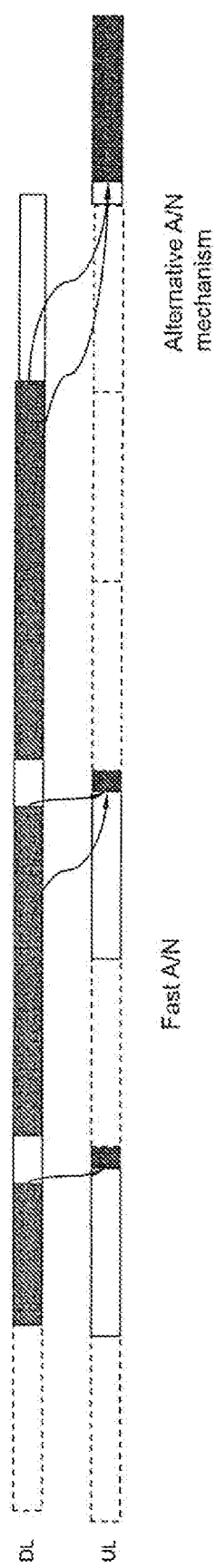
FIG. 12 shows an example of two different relative timings for sending a second transmission with feedback in response to having received a first transmission.

If the NR carrier is to be deployed in the same band as an LTE TDD carrier and due to interference, the UL-DL must be aligned and the ACK/NACK feedback as shown in FIG. 11 cannot be used since LTE has no matching frame structure. In this case, an alternative ACK/NACK feedback structure must be used. The alternative ACK/NACK feedbacks structure resembles a more "regular" UL transmission, e.g. on scheduled resources, see FIG. 12. In FIG. 12 both ACK/NACK feedback mechanisms are shown. More specifically, in FIG. 12 the first two transmissions are acknowledged by an ACK/NACK feedback coming immediately at the end of the transmission. The last transmission is acknowledged by feedback transmitted in a more "regular" UL transmission and is more suitable if coexistence with LTE is required.

The presently described concept of performing a selecting process for selecting a relative timing for sending the second transmission from among a plurality of predetermined relative timing choices can be advantageously applied in the above scenario. In other words, the node can be made more flexible by providing it with the arrangement for performing a selecting process for selecting a relative timing for sending the second transmission from among a plurality of predetermined relative timing choices, as it can then choose e.g. between the fast feedback at the end of the same slot as a first relative timing choice and the "regular" UL transmission on a resource scheduled in a subsequent slot.

Figure 13:
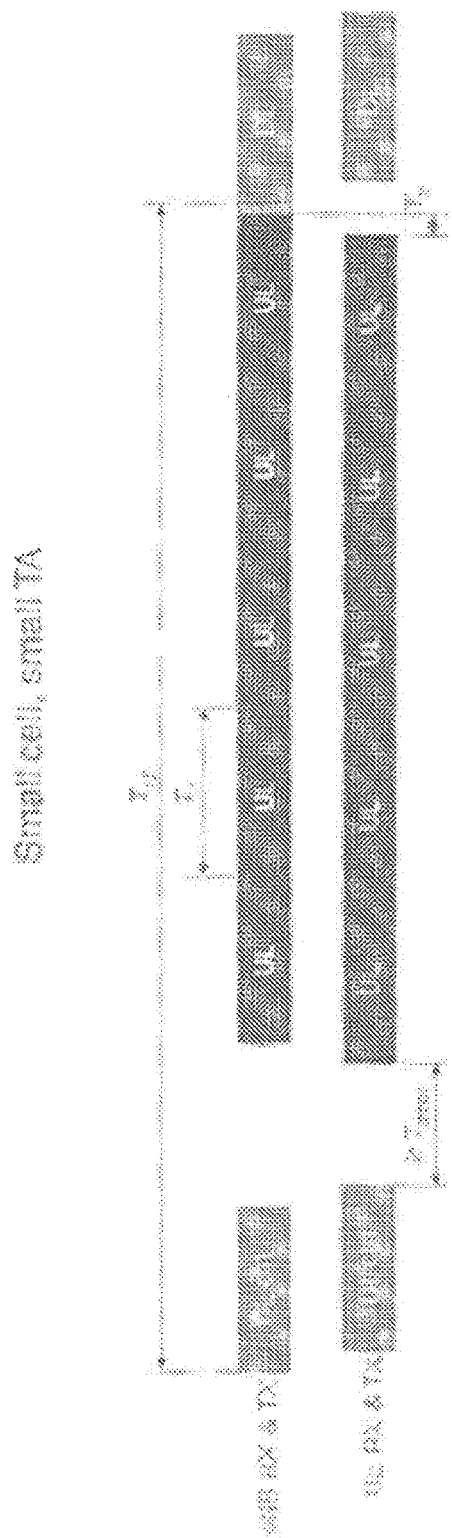
FIG. 13 shows a first scenario of resource allocation and data transmission in response.
Figure 14:
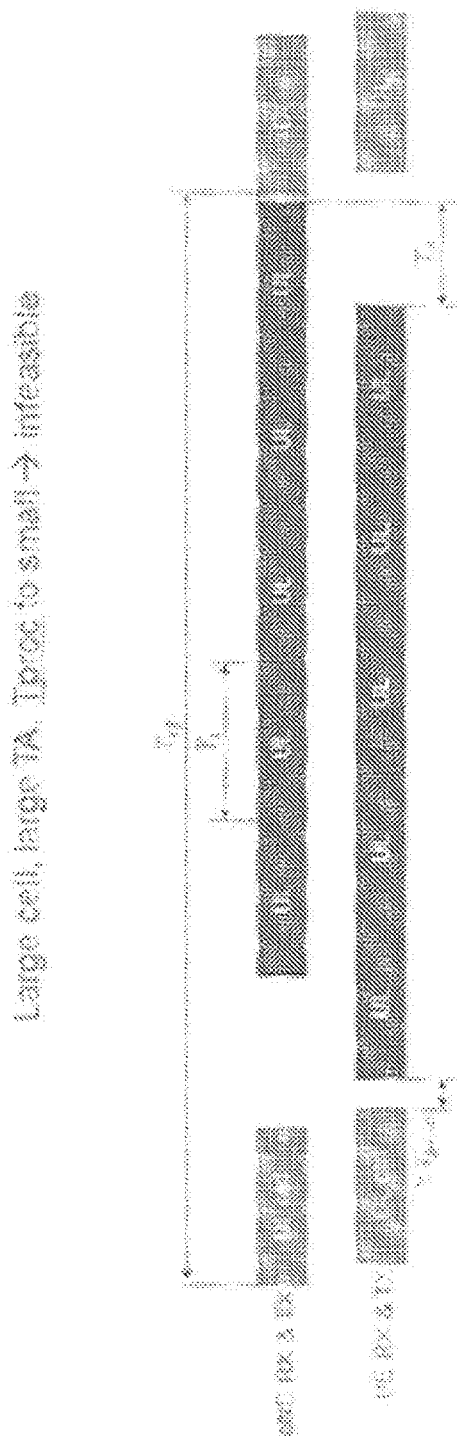
FIG. 14 shows a second scenario of resource allocation and data transmission in response.
Figure 15:
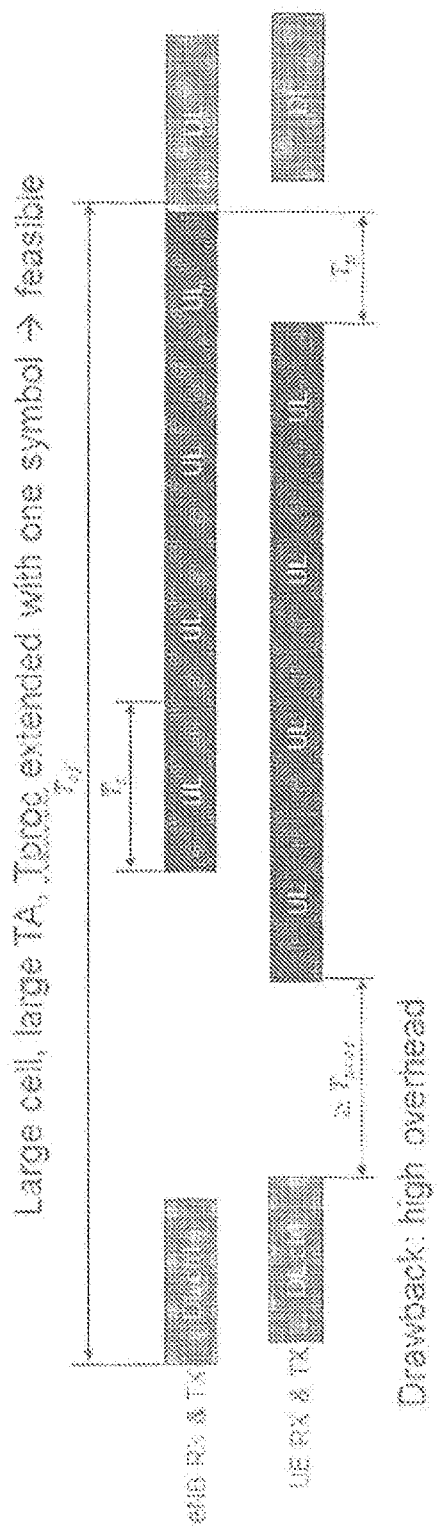
FIG. 15 shows a third scenario of resource allocation and data transmission in response.

FIGS. 13, 14 and 15 show another type of scenario in which the presently described concept may be advantageously applied. In the scenarios of FIGS. 13, 14 and 15, the access node (e.g. an eNB) sends a first transmission (DL ctrl in the figure) which grants an end node (e.g. a UE) the resources to transmit UL transmission for a specific period of time (a resource scheduling). If the response is to be sent in the same slot, the UE must take into account the propagation delay, and transmit the UL transmission such that the UL transmission is received by the eNB before the next transmission (DL in the figure). The last symbol transmitted by the UE is received right before the DL transmission starts again. There is a need for the UE to start transmitting as soon as possible, in order to transmit every symbol of the UL transmission within the scheduled resource grant.

FIG. 13 shows a resource scheduling scenario in which the propagation delay (and thus timing advance) of communications between the access node and an end node is reduced (because the distance from base station to UE is small, e.g. in a small cell). In this scenario, the UE receives a resource scheduling DL transmission. The UE processes the received information and prepares an UL transmission. The UE initiates the UL transmission, taking into account the propagation delay, or the timing advance, such that the UL transmission is received by the eNB at an adequate time. In the scenario of FIG. 13, the UE has enough time to process the resource scheduling DL transmission (DL ctrl) and start transmitting the UL transmission such that every symbol of the UL transmission is received by the eNB during the scheduled resource grant. In other words, the time between the reception of the DL ctrl at the UE and the start of the UL transmission is larger than the time needed for the UE to process, prepare and start transmitting the UL transmission.

FIG. 14 shows a resource scheduling scenario in which the propagation delay (and thus timing advance) of communications between the access node and an end node is large. In this scenario, the UE received the resource scheduling DL transmission, but does not have enough time to process the information and prepare the UL transmission before the time when the UL transmission needs to start so that every symbol of the UL transmission is received by the eNB during the scheduled resource grant.

FIG. 15 shows a possible solution to the problem encountered in FIG. 14. In FIG. 15, the UL transmission is delayed (and shortened) until the next suitable time which would allow the UL transmission to be received by the eNB appropriately. A drawback of the solution in the scenario of FIG. 15 is that a large overhead is created, whereby the channel is unused for a longer period of time. An alternative would be to adjust the period of resources granted to the UE for a UL transmission, such that the resource grant is valid for one or more additional slot or symbol, if necessary. In which case, the DL transmission would resume at a later slot or symbol.

The shown scenarios indicate how the timing advance or cell size can be used as communication condition on the basis of which the selecting process can select a relative timing choice. For example, if the TA is small, then the selecting process may be arranged to select a fast uplink response, as e.g. shown in FIG. 13, whereas if the TA exceeds a predetermined limit, then the selecting process may be arranged to select a slower relative timing choice, e.g. similar to the alternative mechanism shown in FIG. 12 or FIG. 15.

In the following, further technical aspects will be disclosed.

I. Regarding Radio Resource Management (RRM) Requirements for NR, the Following is Disclosed:

Discussion

Multiple Numerologies

In [1], RAN4 has been agreed:
  Evaluate decisions made in RAN1/2/3 August meeting round and investigate likely impacts to future RAN4 RRM requirements and testing. Topics may include:
    . . .
    Measurement gaps for NR
    Impact on RRM requirements from:
      . . .
      Flexibility of subcarrier spacing and multiple numerologies
    . . .

In this section, we further discuss the highlighted topics from the WF in [1].

In RAN1#86, the following new agreements in relation to numerology were achieved:
  NR numerology scalability should allow at least from [3.75 kHz] to 480 kHz subcarrier spacing
  Specification supports multiplexing numerologies in TDM and/or FDM within/across (a) subframe duration(s) from a UE perspective
  A UE has one reference numerology in a given NR carrier which defines subframe duration for the given NR carrier From the above, it is evident that the number of numerologies in NR is not limited to a just few options. This, in combination with other factors, e.g., bandwidths, may make it impossible to explicitly specify RRM requirements for each numerology or each combination involving a numerology. An alternative could be to specify RRM requirements for groups of similar numerologies. For time-related RRM requirements, e.g., handover delays, measurement periods, etc., the requirements could also be specified in a generic way, if the requirement or its part scales with the numerology (which may not be necessarily always possible, e.g., when the RS density does not scale or the UE/gNB processing time do not scale).

Proposal 1: Consider grouping of numerologies in RRM requirements or specifying requirements in a generic way with respect to numerology, e.g., when the requirements or its parts scale with numerology.

Numerology may change in frequency or time in NR on one hand, but one the other hand not all the UEs will be supporting all numerologies and perhaps the numerology at least in some time-frequency resources or at least for the basic signals will be more static.

Proposal 2: The minimum set of RRM requirements need to be defined for scenarios with statically defined numerology being the same in all or at least some time resources, which should be at least the starting point. Next, requirements for scenarios with dynamic or mixed numerologies should be specified in a complementary way.

Numerology Impact on Timing-Related Requirements

The support of multiple numerologies and multiplexing different numerologies in time and/or frequency domain may also have impact on timing related aspects, e.g., the amount of timing adjustment at a time, accuracy, timing adjustment delay. Also, in addition to the dependency of subframe length even the time unit (in LTE, corresponding to Ts specified in 36.211) may not be a single value any more in NR.

Observation 1: Timing related requirements will depend on numerology

Another timing-related aspect which may need to also account for the support of multiple numerologies is the differentiation between synchronous and asynchronous scenarios which in turn determines which requirements apply, e.g., whether the UE is performing measurements on synchronous or asynchronous cells which are using different numerologies and corresponding time scales.

Observation 2: RAN4 needs to define how to differentiate synchronous and asynchronous operation when multiple numerologies are used.

CA Scenarios with Different Numerologies

CA of carriers with different numerologies was discussed in other groups, e.g. in RAN2#95, where the following was concluded:

From RAN2 point of view, aggregation of carriers with different numerologies should be supported in NR. (Modelling aspects such as whether it is a single or multiple MAC entity is FFS)

The above scenario may further impact how the timing is adjusted in such carrier combinations and how to create TAGs. Another issue that may arise is that with cross-carrier scheduling with the carriers using different time scales due to different numerologies.

Proposal 3: RAN4 to discuss the RRM impact of CA scenarios with carriers having different numerologies.

Feedback Mechanisms and Cross-Numerology Scheduling

In LTE, there is a strict pre-defined time relation between some DL and UL transmissions. For example, for the HARQ feedback transmitted by the UE in UL, in general, it is expected that in FDD the UE transmits the feedback in subframe (n+4) for the DL reception in subframe n. For TDD, the relation is also pre-defined but depends on the TDD configuration. In HD-FDD, the timing relation between reception of data at the UE and transmission of HARQ A/N in the uplink is also pre-defined e.g. in NB-loT the ACK/NACK is sent in subframe n+12. For NR, faster feedback mechanisms are being discussed, which has advantages in certain scenarios, but these mechanisms may further depend on numerology of the UL and possibly DL, coverage level, etc. Ultimately, both LTE-like mechanism and fast feedback mechanisms may be supported in NR, depending on the scenarios. Therefore, there may be a need in requirements for the NR feedback mechanisms. Furthermore, some current LTE requirements are measured in terms of ACK/NACK, but if multiple feedback mechanisms are supported in NR, just reusing this metric in NR as it is used in LTE may introduce ambiguity in the requirements.

Proposal 4: Support of multiple feedback mechanisms needs to be considered in NR requirements.

Measurement Gaps

Many LTE requirements account for measurement gaps, which is likely to happen also in NR. In LTE, a single duration of 6 ms for UE measurement gaps has been so far standardized. Furthermore, the measurement gaps are common for all carrier frequencies. In NR, where different numerologies are supported, using common gaps of a single pre-defined length independent of numerology may be not efficient from resource utilization point of view. Furthermore, even intra-frequency measurement gaps may be needed, e.g., due to transmissions misaligned with respect to the center of the bandwidth.

Proposal 5: In NR, more flexible measurements gap configurations are needed.

Beamforming

In [1], RAN4 agreed:

Evaluate decisions made in RAN1/2/3 August meeting round and investigate likely impacts to future RAN4 RRM requirements and testing. Topics may include:

Necessary metric and requirements for beam management measurements

. . .

Impact on RRM requirements from:

. . .

Antenna configuration, e.g., whether the requirements are the same or different for measurements based on beamforming and omni-directional antennas, and applicability of beamforming related requirements for different frequency ranges.

. . .

Impact of NR beamforming techniques, and how to specify generic requirements covering eg analog, digital, or hybrid beamforming

. . .

The topics highlighted above are further discussed in this section.

Some related RAN1 agreements:

Agreements: Beam management=a set of L1/L2 procedures to acquire and maintain a set of TRP(s) and/or UE beams that can be used for DL and UL transmission/reception, which include at least following aspects:

Beam determination=for TRP(s) or UE to select of its own Tx/Rx beam(s).

Beam measurement=for TRP(s) or UE to measure characteristics of received beamformed signals Beam reporting=for UE to report information a property/quality of beamformed signal(s) based on beam measurement Beam sweeping=operation of covering a spatial area, with beams transmitted and/or received during a time interval in a predetermined way.

Agreements: The following DL L1/L2 beam management procedures are supported within one or multiple TRPs:
   P-1: is used to enable UE measurement on different TRP Tx beams to support selection of TRP Tx beams/UE Rx beam(s)
      For beamforming at TRP, it typically includes a intra/inter-TRP Tx beam sweep from a set of different beams
      For beamforming at UE, it typically includes a UE Rx beam sweep from a set of different beams
      FFS: TRP Tx beam and UE Rx beam can be determined jointly or sequentially
   P-2: is used to enable UE measurement on different TRP Tx beams to possibly change inter/intra-TRP Tx beam(s)
      From a possibly smaller set of beams for beam refinement than in P-1
      Note: P-2 can be a special case of P-1
   P-3: is used to enable UE measurement on the same TRP Tx beam to change UE Rx beam in the case UE uses beamforming
   Strive for the same procedure design for Intra-TRP and inter-TRP beam management
      Note: UE may not know whether it is intra-TRP or inter TRP beam
      Note: Procedures P-2&P-3 can be performed jointly and/or multiple times to achieve e.g. TRP Tx/UE Rx beam change simultaneously
      Note: Procedures P-3 may or may not have physical layer procedure spec. impact
   Support managing multiple Tx/Rx beam pairs for a UE
      Note: Assistance information from another carrier can be studied in beam management procedures
      Note that above procedure can be applied to any frequency band
      Note that above procedure can be used in single/multiple beam(s) per TRP
      Note: multi/single beam based initial access and mobility treated within a separate RAN1 agenda item Beam sweeping is one of the antenna configurations to be used in NR, which make the availability of transmission and/or reception occasions time-dependent, e.g., in a predefined way. The frequency or periodicity of the availability is unlikely to be a single fixed number since this would greatly limit network and UE implementations, but likely to make dependent on these parameters the time periods for procedures based on beamformed measurements, e.g., measurement time period, measurement reporting delay, etc. The case of beamforming without beam sweeping in time domain or the omni-directional case can then be viewed as a special case resulting in more frequent or even continuous (e.g., every subframe) availability, provided all other factors are the same, e.g., same signal configuration, etc. The time-based requirements may, however, like in LTE, depend on additional conditions, e.g., bandwidth, channel condition, interference, etc., and some of these conditions may possibly be more typical for some antenna configurations and less typical for the others, but it is still believed that there is no need in explicit relation of the requirements to antenna/beam configurations.

When it comes to the accuracy, the requirements should be transparent to the beam configurations rather than should be determined by traditional factors, e.g., measurement purpose, type of measured signals, signal design and density, bandwidth, etc.

Proposal 6: In NR, time-based requirements are specified in a generic way for different antenna configurations, allowing also for scaling depending on the availability in time of the relevant tx and/or rx beams, e.g., due to beam sweeping. Accuracy requirements should be transparent to beam configurations.

REFERENCES

[1] R4-166735, "Way forward for NR RRM", Ericsson, Nokia, Intel.

Ii. Regarding DL HARQ Feedback Transmission in UL, the Following is Observed:

Introduction

Most of the DL HARQ feedback transmission schemes presented so far focused on the transmission of DL ACK/NACK at the end of a DL-heavy slot duration (with the ACK/NACK corresponding to the DL transmission of the same slot or an earlier slot). Several reasons suggest the need for additional feedback transmission scheme, e.g. the UL transmission duration at the end of a DL-heavy slot is very short resulting in small coverage. It is important that NR coverage can match LTE coverage in similar conditions, therefore additional DL HARQ feedback transmission scheme is needed. Coexistence with LTE FS2—where NR and LTE must share the same UL/DL pattern—is another reason additional feedback transmission scheme is needs.

Discussion

Figure 16:
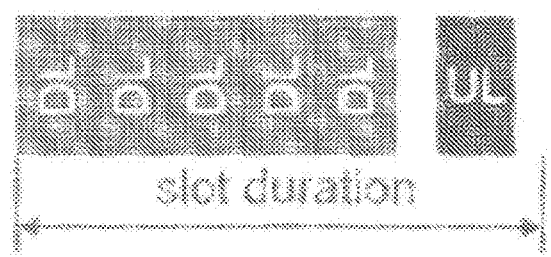
FIG. 16 shows an example of how DL HARQ feedback is transmitted at the end of a DL-heavy slot duration as a form of "immediate" ACK/NACK.

In most RAN1 discussions on DL HARQ feedback transmission in UL a rapid HARQ ACK/NACK feedback transmitted either at the end of the same or at the end of a subsequent slot duration is described. See FIG. 6 for an illustration. FIG. 16 shows how DL HARQ feedback is transmitted at the end of a DL-heavy slot duration ("immediate" ACK/NACK).

A likely outcome of the NR frame structure discussion is a slot length of 7 and/or 14 symbols. To fit the feedback into a small part at the slot end the UL transmission can obviously only be short, typically one or very few symbols. Depending on the numerology one OFDM symbol has length 67 µs/$2^n$. For LTE-like deployments at least n=0 (15 kHz) and n=1 (30 kHz) are interesting options. Feedback transmission over one or few OFDM symbols is much shorter than the LTE PUCCH transmission duration of 1 ms with accordingly reduced coverage. To match LTE PUCCH link budget, it must be possible to transmit DL HARQ feedback in UL over a duration of around 1 ms. The application of multiple RX antennas in the eNB allows shorter transmission durations, however, we believe it is important that NR matches LTE coverage even for similar eNB antenna arrangements.

Observation 1: To match LTE PUCCH link budget, it should be possible to transmit DL HARQ feedback transmissions over approximately 1 ms.

It is envisioned that NR can coexist with LTE FS2 if deployed in the same band. Depending on interference situation this may require same DL/UL pattern in LTE and NR. In such cases it is not possible to transmit DL HARQ feedback at the end of a DL-heavy slot. The UL transmission must be delayed until the next UL opportunity in LTE FS2, see FIG. 17.

Figure 17:
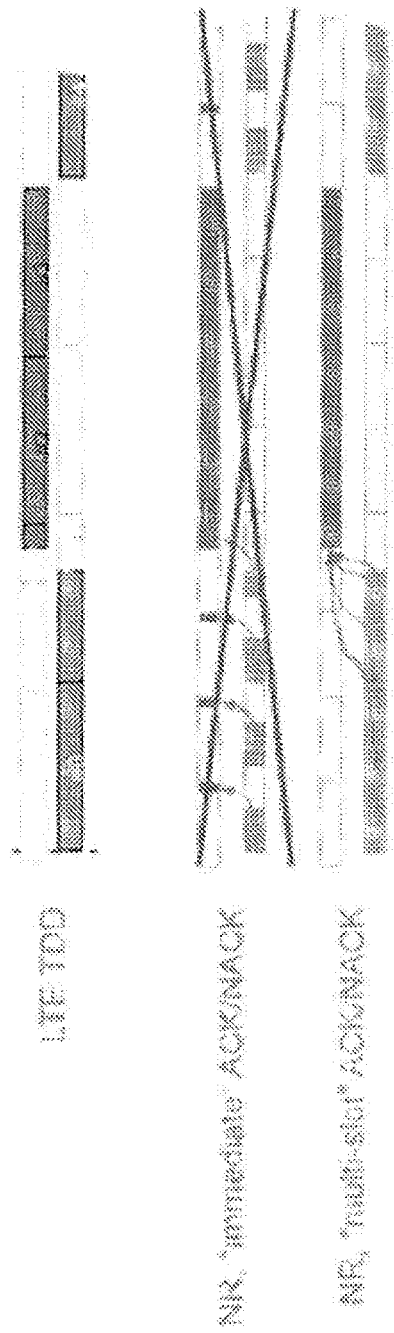
FIG. 17 shows an example of a feedback transmission delayed with respect to the "Immediate" feedback of the example of FIG. 16.

FIG. 17: In coexistence-scenario with LTE TDD, DL HARQ feedback transmission must be delayed until next LTE FS2 UL opportunity.

Observation 2: In coexistence-scenario with LTE TDD, DL HARQ feedback must be delayed until next LTE FS2 UL opportunity.

To solve the link budget issue pointed out in Observation 1 and to solve the coexistence with LTE FS2 an additional DL HARQ feedback transmission scheme is needed in addition to the DL HARQ feedback transmission at the end of a DL-heavy slot duration.

Proposal 1: NR must provide DL HARQ feedback transmission scheme in UL enabling similar link budget as LTE PUCCH Format 1a.

Proposal 2: NR must provide DL HARQ feedback transmission scheme enabling coexistence with LTE FS2.

One possible mechanism could be to rely on the gNB polling feedback for outstanding DL HARQ processes and scheduling the feedback transmission similar to a regular UL transmission. By selecting the transmission time, the gNB can obviously ensure aligned UL transmissions with LTE FS2. To ensure adequate link budget the feedback transmissions may have to extend beyond a slot (especially if a slot is only 7 OFDM symbols or for a numerology with n>0). However, also for other reasons we propose in 0 to specify aggregation of multipole slots in UL; the same principle could also be applied here to enable longer transmission durations with improved link budget.

Conclusion

In this observation, we propose to define DL HARQ feedback transmission schemes in UL that match LTE PUCCH link budget and enable coexistence with LTE FS2.

Observation 1: To match LTE PUCCH link budget, it should be possible to transmit DL HARQ feedback transmissions over approximately 1 ms.

Observation 2: In coexistence-scenario with LTE TDD, DL HARQ feedback must be delayed until next LTE FS2 UL opportunity.

Proposal 1: NR must provide DL HARQ feedback transmission scheme in UL enabling similar link budget as LTE PUCCH Format 1a.

Proposal 2: NR must provide DL HARQ feedback transmission scheme enabling coexistence with LTE FS2.

REFERENCES

R1-167502, "On multi-subframe scheduling for uplink transmissions", Ericsson, RAN1#86, August 2016

The invention claimed is:

1. A wireless device for a radio communication network, the wireless device comprising: a processor; and a memory storing instructions that, when executed by the processor, cause the wireless device to:
send information associated with the wireless device's capability of supporting one or more relative timings of a set of possible relative timing choices to a network node,
receive a first transmission over a data channel, wherein said first transmission is a downlink transmission that comprises data;
receive, from the network node, a Radio Resource Control, RRC, message indicating a set of possible relative timing choices and a Downlink Control Information, DCI, message indicating a relative timing from the configured set;
determine, according to the received DCI message, a relative timing for sending a second transmission in response to said first transmission from among the configured set of relative timing choices; and
send, to the network node, said second transmission in accordance with the determined relative timing wherein said second transmission is an uplink transmission that comprises feedback information related to a receipt of said data;
wherein the determining takes into account information associated with the wireless device's capability of supporting one or more relative timings of the set of possible relative timing choices.

2. The wireless device according to claim 1, wherein determining the relative timing takes into account information associated with one or more communicating conditions of said wireless device.

3. The wireless device according to claim 2, wherein said information associated with said one or more communicating conditions comprises one or more of a time of arrival, a timing advance, a round-trip delay time, a reference signal time difference, a synchronization signal time difference, an Rx-Tx time difference, and a propagation delay.

4. The wireless device according to claim 1, wherein said information associated with the wireless device's capability of supporting one or more of the set of possible relative timing choices comprises information on one or more numerologies supported by the wireless device.

5. The wireless device according to claim 1, wherein said first transmission is over a Physical Downlink Control Channel, PDCCH, and said second transmission is over a Physical Uplink Shared Data Channel, PUSCH.

6. The wireless device according claim 1, wherein said relative timing is expressed in terms of a given number of slots.

7. The wireless device according to claim 1, wherein the relative timing choices are related to a time difference between receiving the first transmission and sending the second transmission.

8. A method of operating a wireless device for a radio communication network, the method comprising:
sending information associated with the wireless device's capability of supporting one or more of relative timings of a set of possible relative timing choices to a network node,
receiving a first transmission over a data channel, wherein said first transmission is a downlink transmission that comprises data;
receiving, from the network node, Radio Resource Control, RRC, message indicating a set of possible relative timing choices and a Downlink Control Information, DCI, message indicating a relative timing from the configured set;
determining, according to the received DCI control message, a relative timing for sending a second transmission in response to said first transmission from among the configured set of relative timing choices; and
sending, to the network node, said second transmission in accordance with the determined relative timing, where said second transmission is an uplink transmission that comprises feedback information related to a receipt of said data;
wherein the determining takes into account information associated with the wireless device's capability of supporting one or more relative timings of the set of possible relative timing choices.

9. The method according to claim 8, wherein information associated with the wireless device's capability of supporting one or more relative timings of the set of possible relative timing choices comprises information on one or more numerologies supported by the wireless device.

10. The method according to claim 8, wherein said first transmission is over a Physical Downlink Control Channel, PDCCH, and said second transmission is over a Physical Uplink Shared Data Channel, PUSCH.

11. The method according to claim 8, wherein said relative timing is expressed in terms of a given number of slots.

12. The method according to claim 8, wherein the relative timing choices are related to a time difference between receiving the first transmission and sending the second transmission.

13. The method according to claim 8, wherein determining the relative timing takes into account information associated with one or more communicating conditions of said wireless device.

14. The method according to claim 13, wherein said information associated with said one or more communicating conditions comprises one or more of a time of arrival, a timing advance, a round-trip delay time, a reference signal time difference, a synchronization signal time difference, an Rx-Tx time difference, and a propagation delay.

15. A method of operating a network node for a radio communication network, comprising:
    receiving, from a wireless device, information associated with the wireless device's capability of supporting one or more of relative timings of a set of possible relative timing choices,
    sending, to the wireless device, a first transmission over a data channel, wherein said first transmission is a downlink transmission that comprises data;
    sending, to the wireless device, a Radio Resource Control, RRC, message indicating a set of possible relative timing choices and a Downlink Control Information, DCI, message indicating a relative timing from the configured set; and
    receiving, from the wireless device, a second transmission in response to said first transmission, wherein said second transmission is an uplink transmission that comprises feedback information related to a receipt of said data, wherein said method also comprises:
    determining the relative timing for sending said second transmission in response to said first transmission from among the configured set of relative timing choices;
    wherein the determining takes into account the information associated with the wireless device's capability of supporting one or more relative timings of the set of possible relative timing choices.

16. A network node for a radio communication network, the network node comprising: a processor; and a memory storing instructions that, when executed by the processor, cause the network node to:
    receive, from a wireless device, information associated with the wireless device's capability of supporting one or more of relative timings of a set of possible relative timing choices,
    send, to the wireless device, a first transmission over a data channel, wherein said first transmission is a downlink transmission that comprises data;
    send, to the wireless device, a Radio Resource Control, RRC, message indicating a set of possible relative timing choices and a Downlink Control Information, DCI, message indicating a relative timing from the configured set; and
    receive, from the wireless device, a second transmission in response to said first transmission, wherein said second transmission is an uplink transmission that comprises feedback information related to a receipt of said data, and
    determine the relative timing for sending said second transmission in response to said first transmission from among the configured set of relative timing choices;
    wherein the determination takes into account the information associated with the wireless device's capability of supporting one or more relative timings of the set of possible relative timing choices.

\* \* \* \* \*

UNITED STATES PATENT AND TRADEMARK OFFICE
CERTIFICATE OF CORRECTION

PATENT NO. : 11,595,165 B2
APPLICATION NO. : 15/763948
DATED : February 28, 2023
INVENTOR(S) : Siomina et al.

It is certified that error appears in the above-identified patent and that said Letters Patent is hereby corrected as shown below:

In the Specification

In Column 1, Line 25, delete "but also" and insert -- also --, therefor.

In Column 3, Line 16, delete "DESCRIPTION" and insert -- BRIEF DESCRIPTION --, therefor.

In Column 5, Line 37, delete "(down link)" and insert -- (downlink) --, therefor.

In Column 6, Line 5, delete "selecting" and insert -- selection --, therefor.

In Column 6, Line 41, delete "may vary may vary" and insert -- may vary --, therefor.

In Column 8, Line 39, delete "member" and insert -- members --, therefor.

In Column 11, Lines 16-23, delete "Examples of a numerology are one or more of subcarrier....................................numerologies." and insert the same at Line 15, after "numerology." as a continuation paragraph.

In Column 12, Line 62, delete "it also" and insert -- it is also --, therefor.

In Column 13, Line 32, delete "mechanisms" and insert -- mechanisms. --, therefor.

In Column 13, Line 35, delete "transmitted" and insert -- transmitted. --, therefor.

In Column 13, Line 41, delete "condition" and insert -- condition. --, therefor.

In Column 13, Line 42, delete "(optional)_Indicating" and insert -- (optional): Indicating --, therefor.

In Column 13, Line 43, delete "choice" and insert -- choice. --, therefor.

Signed and Sealed this
Seventh Day of May, 2024

Katherine Kelly Vidal
*Director of the United States Patent and Trademark Office*

In Column 14, Line 37, delete "feedback)" and insert -- feedback). --, therefor.

In Column 15, Line 23, delete "e.g.," and insert -- e.g.: --, therefor.

In Column 15, Line 32, delete "threshold" and insert -- threshold. --, therefor.

In Column 15, Line 35, delete "threshold" and insert -- threshold. --, therefor.

In Column 15, Line 56, delete "pathloss" and insert -- path loss --, therefor.

In Column 19, Lines 17-18, delete "feedbacks" and insert -- feedback --, therefor.

In Column 20, Line 24, delete "slot or symbol," and insert -- slots or symbols, --, therefor.

In Column 21, Line 17, delete "one" and insert -- on --, therefor.

In Column 21, Line 35, delete "any more" and insert -- anymore --, therefor.

In Column 21, Line 38, delete "numerology" and insert -- numerology. --, therefor.

In Column 22, Line 6, delete "NB-loT" and insert -- NB-IoT --, therefor.

In Column 22, Line 64, delete "select of" and insert -- select --, therefor.

In Column 23, Line 1, delete "a" and insert -- on a --, therefor.

In Column 24, Line 18, delete "Ii." and insert -- II. --, therefor.

In Column 24, Line 33, delete "needs." and insert -- needed. --, therefor.

In the Claims

In Column 26, Line 31, in Claim 6, delete "according" and insert -- according to --, therefor.